US012092974B2

(12) United States Patent
Nishiyama et al.

(10) Patent No.: US 12,092,974 B2
(45) Date of Patent: Sep. 17, 2024

(54) TONER CARTRIDGE ATTACHABLE TO IMAGE FORMING APPARATUS

(71) Applicant: BROTHER KOGYO KABUSHIKI KAISHA, Nagoya (JP)

(72) Inventors: Hideshi Nishiyama, Owariasahi (JP); Keita Shimizu, Nagoya (JP)

(73) Assignee: BROTHER KOGYO KABUSHIKI KAISHA, Aichi (JP)

( * ) Notice: Subject to any disclaimer, the term of this patent is extended or adjusted under 35 U.S.C. 154(b) by 0 days.

(21) Appl. No.: 18/302,507

(22) Filed: Apr. 18, 2023

(65) Prior Publication Data

US 2023/0297007 A1 Sep. 21, 2023

Related U.S. Application Data

(63) Continuation of application No. 17/526,251, filed on Nov. 15, 2021, now Pat. No. 11,635,707, which is a (Continued)

(30) Foreign Application Priority Data

Mar. 31, 2016 (JP) ................................ 2016-073399

(51) Int. Cl.
*G03G 15/08* (2006.01)

(52) U.S. Cl.
CPC ..... *G03G 15/0889* (2013.01); *G03G 15/0865* (2013.01); *G03G 15/0886* (2013.01);
(Continued)

(58) Field of Classification Search
CPC .......... G03G 15/0089; G03G 15/0865; G03G 15/0886; G03G 15/0891; G03G 2215/0692; G03G 2215/0827; G03G 2215/085
See application file for complete search history.

(56) References Cited

U.S. PATENT DOCUMENTS 5,078,303 A 1/1992 Kikuchi et al.
5,369,479 A 11/1994 Tsuyuki
(Continued)

FOREIGN PATENT DOCUMENTS

CN 1445620 A 10/2003
CN 101025592 A 8/2007
(Continued)

OTHER PUBLICATIONS

Office Action issued in corresponding Chinese Patent Application No. 202110663371.8, Aug. 1, 2023.
(Continued)

*Primary Examiner* — Victor Verbitsky
(74) *Attorney, Agent, or Firm* — Merchant & Gould P.C.

(57) ABSTRACT

Toner cartridge includes a housing, an agitator, an auger, a first protrusion, and a second protrusion. The housing includes a first toner accommodating portion having and a second toner accommodating portion. The auger is rotatable about a second axis extending in a first direction and is configured to convey toner from a first toner accommodating portion to the second toner accommodating portion. The first protrusion is positioned at a first side of the second toner accommodating portion. The first protrusion extends in the first direction. The second protrusion is positioned at a second side of the second toner accommodating portion and extends in the first direction.

9 Claims, 27 Drawing Sheets

Related U.S. Application Data continuation of application No. 16/872,893, filed on May 12, 2020, now Pat. No. 11,181,852, which is a continuation of application No. 16/193,613, filed on Nov. 16, 2018, now Pat. No. 10,705,456, which is a continuation of application No. 15/464,977, filed on Mar. 21, 2017, now Pat. No. 10,180,640.

(52) U.S. Cl.
CPC . *G03G 15/0891* (2013.01); *G03G 2215/0692* (2013.01); *G03G 2215/0827* (2013.01); *G03G 2215/085* (2013.01)

(56) References Cited

U.S. PATENT DOCUMENTS

| | | | |
|---|---|---|---|
| 7,734,231 | B2 | 6/2010 | Eto et al. |
| 8,254,807 | B2 | 8/2012 | Hayakawa et al. |
| 8,958,728 | B2 | 2/2015 | Hotani |
| 8,995,889 | B2 | 3/2015 | Leemhuis |
| 9,383,680 | B2 | 7/2016 | Eto |
| 2004/0022556 | A1 | 2/2004 | Nomura |
| 2008/0075506 | A1 | 3/2008 | Sato |
| 2008/0170890 | A1 | 7/2008 | Nishimura et al. |
| 2008/0175629 | A1 | 7/2008 | Eto et al. |
| 2009/0129813 | A1 | 5/2009 | Nagashima et al. |
| 2009/0297226 | A1 | 12/2009 | Nagashima et al. |
| 2010/0329734 | A1 | 12/2010 | Hayakawa et al. |
| 2010/0329746 | A1 | 12/2010 | Sato |
| 2011/0305486 | A1 | 12/2011 | Ohgoshi et al. |
| 2012/0275821 | A1 | 11/2012 | Watanabe |
| 2014/0044459 | A1 | 2/2014 | Hotani |
| 2014/0072348 | A1 | 3/2014 | Leemhuis |
| 2014/0086642 | A1 | 3/2014 | Itabashi |
| 2015/0071685 | A1 | 3/2015 | Ichikawa |
| 2015/0248107 | A1 | 9/2015 | Hamada et al. |
| 2016/0033903 | A1 | 2/2016 | Eto |
| 2016/0077487 | A1 | 3/2016 | Hayakawa et al. |
| 2017/0045841 | A1 | 2/2017 | Hayakawa et al. |
| 2017/0285530 | A1 | 10/2017 | Nishiyama et al. |

FOREIGN PATENT DOCUMENTS

| | | | | |
|---|---|---|---|---|
| CN | 101226364 | A | | 7/2008 |
| CN | 102279543 | A | | 12/2011 |
| CN | 103676560 | A | | 3/2014 |
| CN | 104423211 | A | | 3/2015 |
| CN | 204374613 | U | | 6/2015 |
| CN | 105319906 | A | | 2/2016 |
| EP | 3 751 351 | B1 | | 1/2024 |
| JP | 60130772 | A | * | 7/1985 |
| JP | S60-130772 | A | | 7/1985 |
| JP | S60-138578 | A | | 7/1985 |
| JP | 60-147771 | A | | 8/1985 |
| JP | H03-196074 | A | | 8/1991 |
| JP | 2003-280321 | A | | 10/2003 |
| JP | 2004-334054 | A | | 11/2004 |
| JP | 2007-178971 | A | | 7/2007 |
| JP | 2008203830 | A | | 9/2008 |
| JP | 2011-013367 | A | | 1/2011 |
| JP | 2011-13368 | A | | 1/2011 |
| JP | 2013-161091 | A | | 8/2013 |
| JP | 2014-035388 | A | | 2/2014 |
| JP | 2015-064447 | A | | 4/2015 |
| JP | 2016-031496 | A | | 3/2016 |
| JP | 6210121 | B2 | | 10/2017 |
| WO | 2016017828 | A1 | | 2/2016 |

OTHER PUBLICATIONS

Jun. 6, 2017—International Search Report and Written Opinion—PCT/JP2017/012581.
Nov. 2, 2018—(AU) Examination Report—App 2017244690.
Apr. 18, 2019—(EP) Extended Search Report—App 17775048.6.
Mar. 4, 2019—(KR) Notification of Reason for Refusal—App 10-2018-7031397.
Jul. 8, 2019—(KR) Grant of Patent—App 10-2018-7031397.
Sep. 2, 2019—(CN) Notification of the First Office Action—App 201710215959.0.
Feb. 17, 2020—(ID) Office Action—App PID201808651.
Mar. 31, 2020—(JP) Notification of Reasons for Refusal—App 2017-170100.
Jun. 30, 2020—(CN) Notification of the Second Office Action—App 201710215959.0.
JP 2015064447 A T Machine Translation, Japan, 3-205, Hirokai—in parent application.
Office Action issued in corresponding Indian Patent Application No. 201817039856, Oct. 5, 2020.
Extended European Search Report issued in corresponding European Patent Application No. 20168147.5, Nov. 16, 2020.
Office Action issued in corresponding Chinese Patent Application No. 201710215959.0, Dec. 22, 2020.
Office Action (Notice of Reasons for Refusal) issued in corresponding Japanese Patent Application No. 2021-122222, Apr. 26, 2022.
Office Action issued in corresponding Mexican Patent Application No. MX/a/2021/006877, Jun. 26, 2024.

* cited by examiner

TONER CARTRIDGE ATTACHABLE TO IMAGE FORMING APPARATUS

CROSS REFERENCE TO RELATED APPLICATION

This application is a continuation of U.S. patent application Ser. No. 17/526,251, filed Nov. 15, 2021, which is a continuation of U.S. patent application Ser. No. 16/872,893 filed May 12, 2020, now. U.S. Pat. No. 11,181,852, which is a continuation of U.S. patent application Ser. No. 16/193,613 filed Nov. 16, 2018, now U.S. Pat. No. 10,705,456, which is a continuation of U.S. patent application Ser. No. 15/464,977 filed Mar. 21, 2017, now U.S. Pat. No. 10,180,640, which claims priority from Japanese Patent Application No. 2016-073399 filed Mar. 31, 2016. The entire contents of the priority applications are incorporated herein by reference.

TECHNICAL FIELD

The present disclosure relates to a toner cartridge attachable to an image forming apparatus.

BACKGROUND

A toner cartridge that is attachable in an image-forming apparatus is known in the art. The toner cartridge accommodates toner.

SUMMARY

A toner cartridge in the prior art, for example, has a housing for accommodating toner, an opening for discharging toner, and an agitator for conveying the toner toward the opening. The toner cartridge further includes a first protrusion that protrudes from one side surface of the toner cartridge in an axial direction aligned with the rotational shaft of the agitator, and a second protrusion that protrudes from the other side surface of the toner cartridge in the axial direction of the agitator. When the toner cartridge is attached to or mounted in a developing unit, the first and second protrusions on the toner cartridge are fitted into grooves formed in the developing unit, thereby fixing the position of the cartridge relative to the developing unit during the attaching operation. Subsequently, the toner cartridge is pivoted about the first and second protrusions. The discharge opening in the toner cartridge is formed at a central position between the first and second protrusions. The agitator is positioned between the first and second protrusions and conveys toner in a direction that intersects the axial direction of the agitator shaft.

While the toner cartridge described in the art has an agitator for conveying toner in a direction that intersects the axial direction of the agitator shaft, in some cases it is desirable to further convey the toner along the axial direction of the agitator. However, the prior art does not suggest or disclose a toner cartridge having a structure (an auger, for example) for conveying toner along the axial direction of the agitator. Further, the prior art does not suggest or disclose the structure for fixing the position of a toner cartridge having this configuration in a developing unit or image-forming apparatus during the attaching operation of the toner cartridge.

In view of the foregoing, it is an object of the present disclosure to provide a toner cartridge having an agitator for conveying toner in a direction intersecting the axial direction of the agitator and a structure for further conveying the toner along the axial direction of the agitator, and that is capable of being fixed in position in a developing unit or image-forming apparatus during an operation for attaching the toner cartridge in the developing unit or image-forming apparatus.

According to one aspect, the disclosure provides a toner cartridge including a housing, an agitator, an auger, and a first protrusion, and a second protrusion. The first toner accommodating portion has a first interior space elongated in the first direction. The second toner accommodating portion is positioned at one side in the second direction of the first toner accommodating portion and has a second interior space in communication with the first interior space. The second interior space is elongated in the first direction. The housing has a first opening portion at one side in the first direction of the second toner accommodating portion. The first opening portion is configured to discharge toner therefrom. The agitator is rotatable about a first axis extending in the first direction. The agitator is configured to agitate the toner in the first interior space and is configured to convey the toner from the first interior space to the second interior space. The auger is rotatable about a second axis extending in the first direction and configured to convey the toner from the second interior space to the first opening portion. The first protrusion is positioned at the one side in the first direction of the second toner accommodating portion and at the one side in the first direction of the first opening portion. The first protrusion extends in the first direction. The second protrusion is positioned at another side in the first direction of the second toner accommodating portion and extends in the first direction.

BRIEF DESCRIPTION OF THE DRAWINGS

The particular features and advantages of the disclosure will become apparent from the following description taken in connection with the accompanying drawings, in which.

DETAILED DESCRIPTION

Figure 1:
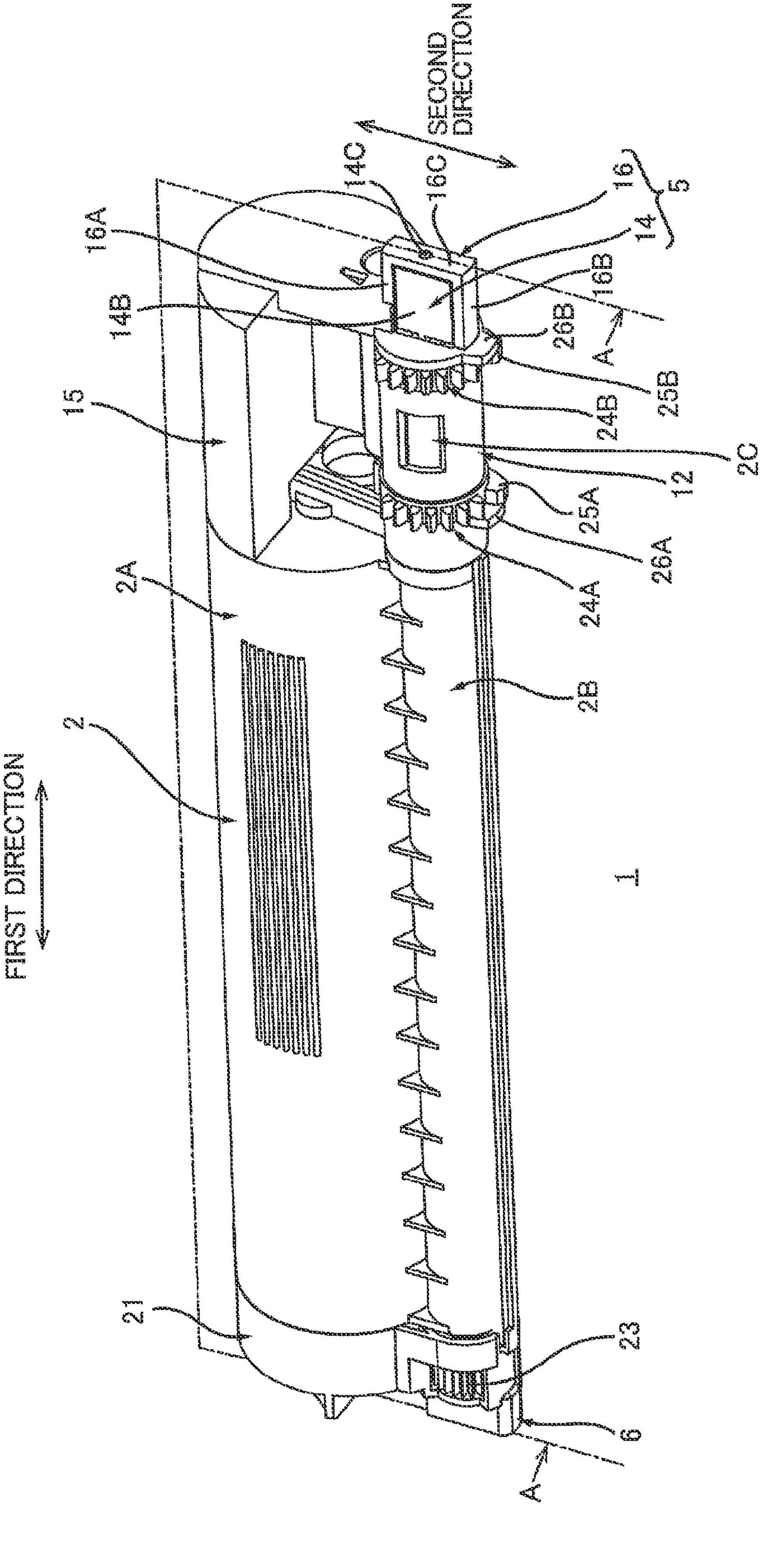
FIG. 1 is a perspective view of a toner cartridge 1 according to a first embodiment.

A toner cartridge 1 according to an embodiment will be described while referring to the accompanying drawings wherein like parts and components are designated by the same reference numerals to avoid duplicating description.

The terms “upward”, “downward”, “upper”, “lower”, “above”, “below”, “beneath”, “right”, “left”, “front”, “rear” and the like will be used throughout the description assuming that the toner cartridge 1 is disposed in an orientation in which it is intended to be used. In use, the toner cartridge 1 is disposed as shown in FIG. 1.

1. Overview of Toner Cartridge 1

An overview of a toner cartridge 1 will be described.

Figure 12:
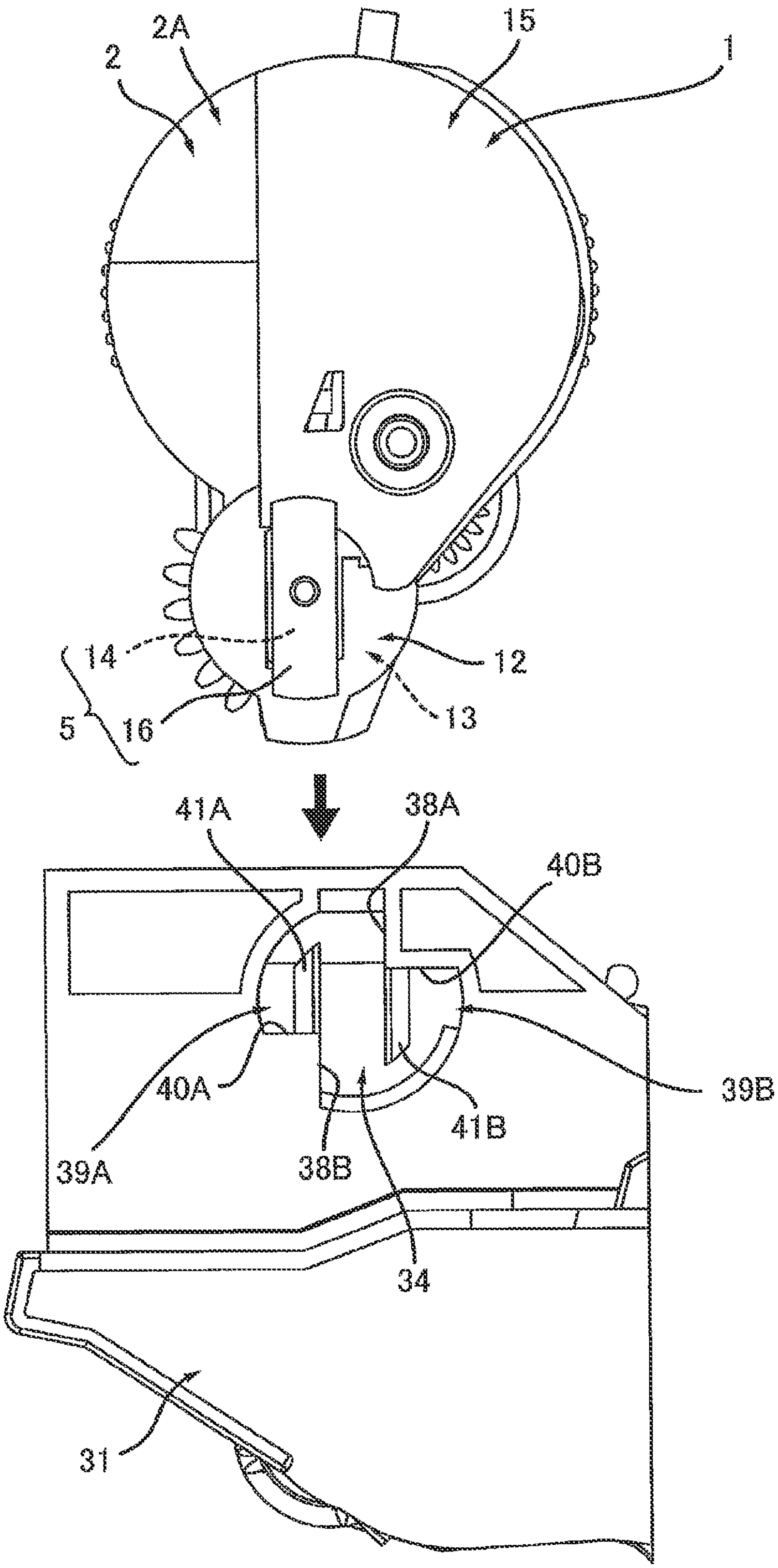
FIG. 12 is an explanatory drawing of attachment of the toner cartridge 1 to the developing unit 31, which illustrates a state before the toner cartridge 1 is mounted in the developing unit 31.
Figure 13:
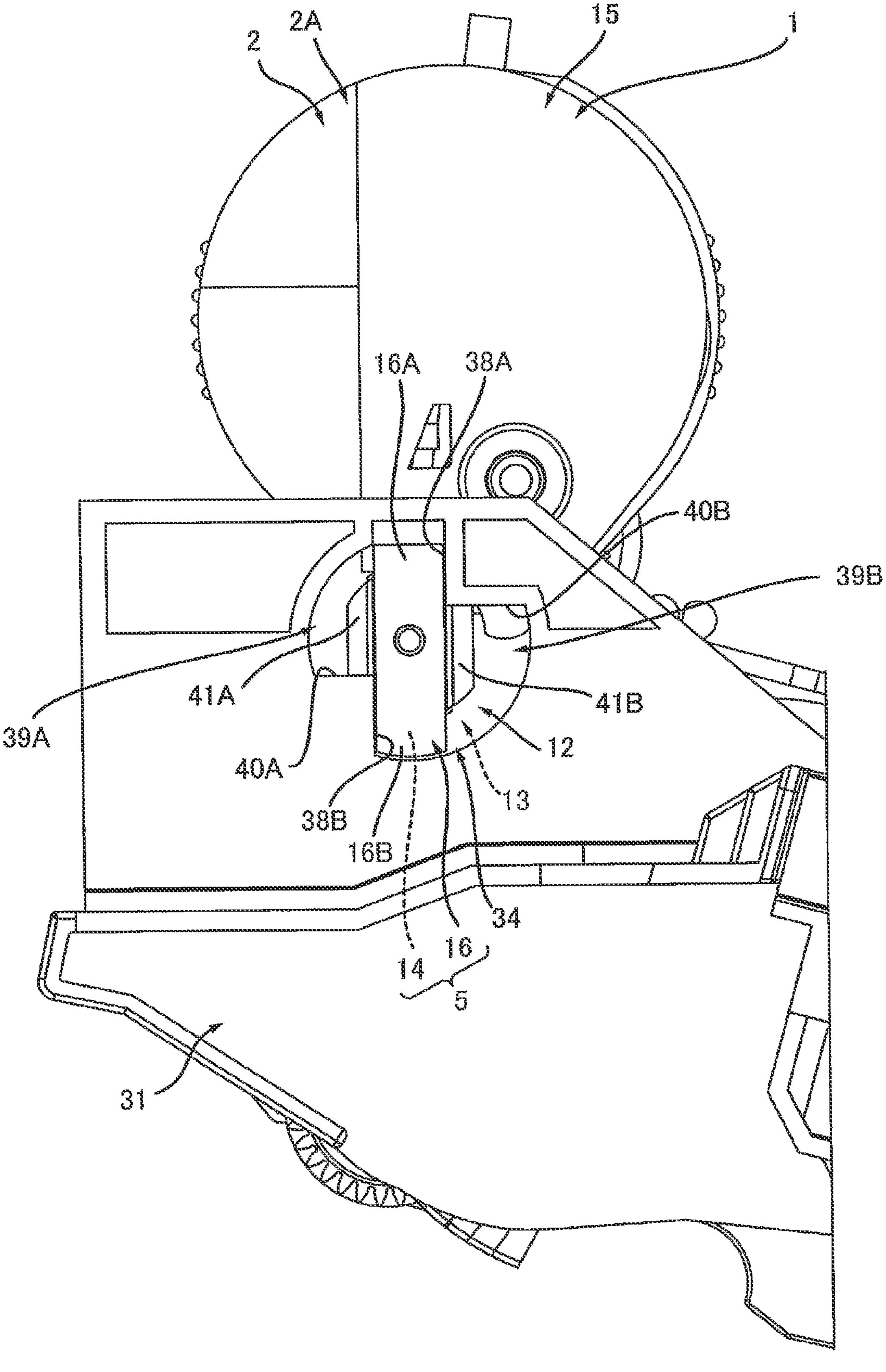
FIG. 13 is an explanatory drawing of the attachment of the toner cartridge 1 to the developing unit 31, which illustrates a state where the toner cartridge 1 is mounted in the developing unit 31 and a housing 2 is at a first position.

The toner cartridge 1 shown in FIG. 1 is a cartridge that accommodates toner. As will be described later in greater detail, the toner cartridge 1 is attached to or mounted in a developing unit 31 described later, as shown in FIGS. 12 and 13. The toner cartridge 1 is subsequently attached to the developing unit 31 by pivoting the toner cartridge 1 relative to the developing unit 31 from the state shown in FIG. 13 to the state shown in FIG. 24. When attached to the developing unit 31, the toner cartridge 1 can supply toner to the developing unit 31. Note that the action of pivoting the toner cartridge 1 denotes an action of rotating the toner cartridge 1 about an axis passing through one portion of the toner cartridge 1 itself. Specifically, the axis passing through the toner cartridge 1 itself is a second axis A2 described later.

Figure 2:
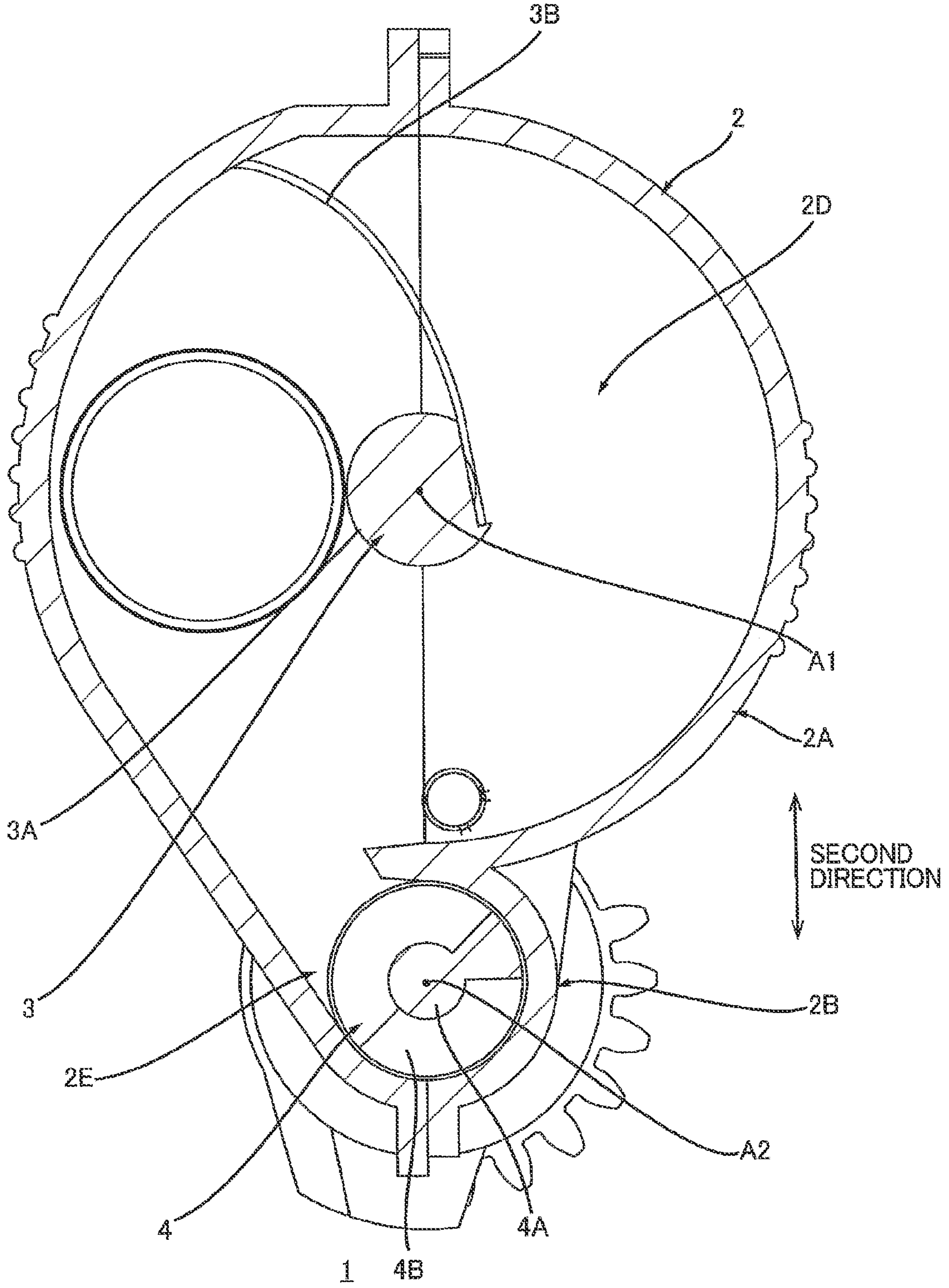
FIG. 2 is a cross-sectional view of a center portion of the toner cartridge 1.
Figure 3:
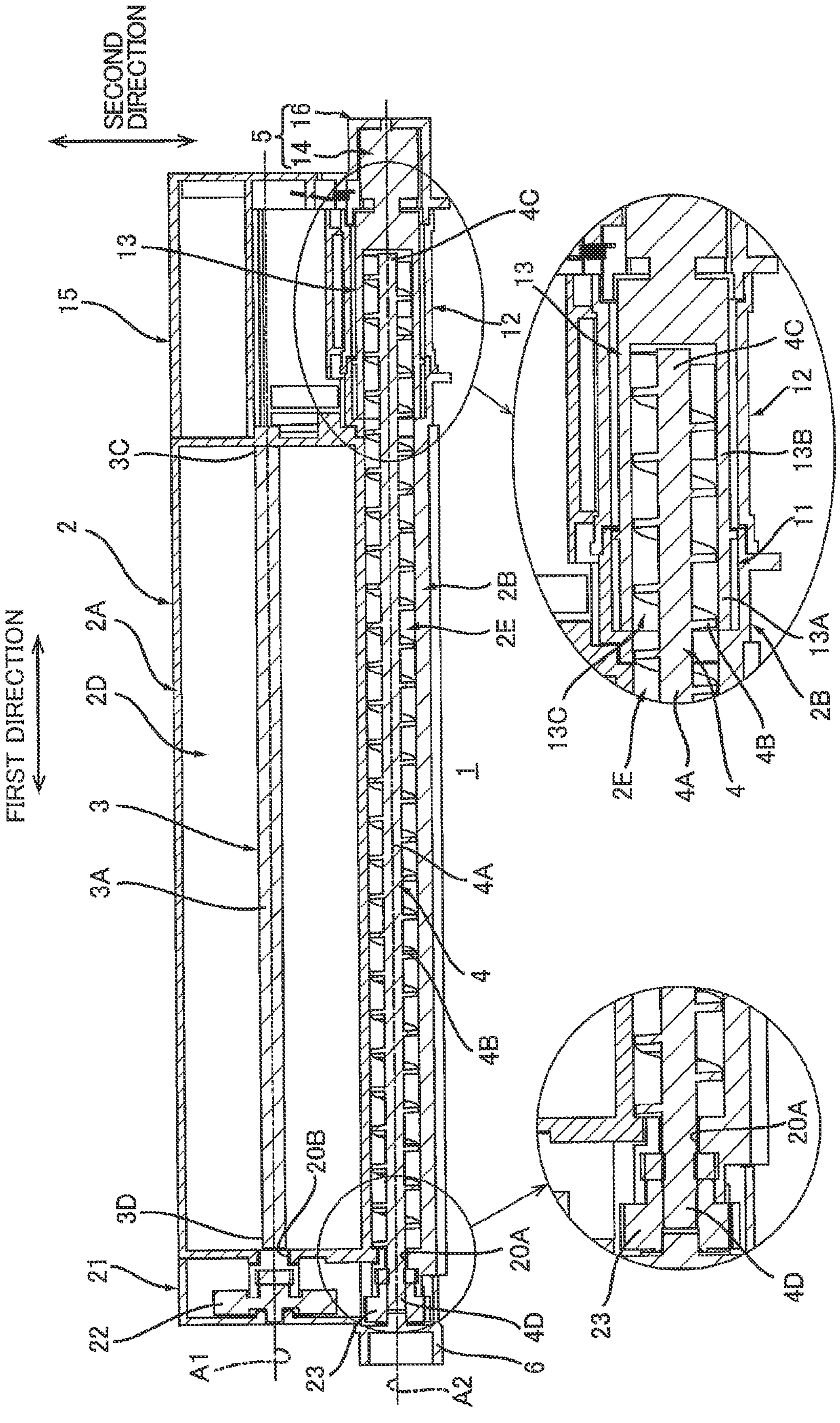
FIG. 3 is a cross-sectional view taken along a line A-A of FIG. 1.

As shown in FIGS. 1 through 3, the toner cartridge 1 includes a housing 2, an agitator 3, an auger 4, a first protrusion 5, and a second protrusion 6.

1.1 Housing 2

The housing 2 is elongated in a first direction. The housing 2 includes a first toner-accommodating section 2A, and a second toner-accommodating section 2B. The second toner-accommodating section 2B is positioned on one side of the first toner-accommodating section 2A in a second direction. The second direction is defined as the ±directions along a line segment connecting a first axis A1 (described later) and a second axis A2 (described later). The first toner-accommodating section 2A is elongated in the first direction. The first toner-accommodating section 2A has a cylindrical shape. The first toner-accommodating section 2A includes a first interior space 2D that is elongated in the first direction. The first interior space 2D can accommodate toner. The second toner-accommodating section 2B is elongated in the first direction. The second toner-accommodating section 2B has a cylindrical shape, the outer diameter of which is smaller than the outer diameter of the first toner-accommodating section 2A. The second toner-accommodating section 2B includes a second interior space 2E elongated in the first direction. The first interior space 2D and second interior space 2E are juxtaposed in the second direction. The second interior space 2E is in communication with the first interior space 2D. The second interior space 2E has a smaller inner capacity than the first interior space 2D. Note that the first toner-accommodating section 2A and second toner-accommodating section 2B may be integrally configured. Alternatively, the first toner-accommodating section 2A and second toner-accommodating section 2B may be configured of separate members that are assembled together. The first toner-accommodating section 2A and second toner-accommodating section 2B are examples of a first toner accommodating portion and a second toner-accommodating portion, respectively.

The housing 2 also has a first opening 2C as an example of a first opening portion. The first opening 2C is positioned on a first side of the second toner-accommodating section 2B in the first direction. The first opening 2C is also positioned closer to the first side in the first direction than the first toner-accommodating section 2A is to the first side. That is, the first opening 2C is positioned closer to the first side in the first direction than the agitator 3 is to the first side. As will be described later in greater detail, the first opening 2C allows toner to be discharged from the second interior space 2E. By positioning the first opening 2C closer to the first side in the first direction than the first toner-accommodating section 2A and the agitator 3 are to the first side, toner conveyed by the agitator 3 from the first interior space 2D to the second interior space 2E is not directly discharged from the first opening 2C. Toner in the second interior space 2E can only be conveyed to the first opening 2C by the auger 4. Thus, toner in the first toner-accommodating section 2A can be quantitatively conveyed to the first opening 2C to be discharged therefrom.

When the toner cartridge 1 is mounted in the developing unit 31 described later, the housing 2 can pivot relative to the developing unit 31 between a first position (see FIG. 13) and a second position (see FIG. 24).

1.2 Agitator 3

The agitator 3 is disposed inside the first interior space 2D. The agitator 3 can stir or agitate toner in the first interior space 2D and can convey the toner from the first interior space 2D to the second interior space 2E. The agitator 3 is rotatable about a first axis A1 that extends in the first direction. The agitator 3 includes an agitator shaft 3A, and a blade 3B. The agitator shaft 3A extends along the first axis A1. The blade 3B extends from the agitator shaft 3A along a radial direction of the first toner-accommodating section 2A. The blade 3B is capable of rotating together with the agitator shaft 3A. The blade 3B is disposed inside the first interior space 2D. The blade 3B has a proximal edge connected to the agitator shaft 3A, and a distal edge separated farthest from the agitator shaft 3A. The distal edge of the blade 3B contacts the inner surface of the first toner-accommodating section 2A. By contacting the inner surface of the first toner-accommodating section 2A, the distal edge of the blade 3B curves toward the upstream side in the rotating direction of the agitator 3. By rotating the blade 3B, the agitator 3 can stir toner in the first interior space 2D and convey the toner from the first interior space 2D to the second interior space 2E.

1.3 Auger 4

The auger 4 is disposed inside the second interior space 2E. As will be described later in greater detail, the auger 4 is configured to convey toner from the second interior space 2E to the first opening 2C. The auger 4 is elongated in the first direction. The auger 4 is rotatable about a second axis A2 that extends in the first direction. Specifically, the auger 4 includes a shaft 4A, and a helical part 4B. The shaft 4A extends along the first axis A1. The helical part 4B protrudes from the shaft 4A in radial directions of the first toner-accommodating section 2A. The helical part 4B has a helical shape whose axis extends along the first direction.

1.4 First Protrusion 5 and Second Protrusion 6

The first protrusion 5 is positioned on a first end portion of the toner cartridge 1 in the first direction. The first protrusion 5 is positioned on the side of the first opening 2C opposite the second toner-accommodating section 2B in the first direction. In other words, the first protrusion 5 is positioned on the first side of the second toner-accommodating section 2B in the first direction and on the first side of the first opening 2C in the first direction. The first protrusion 5 is elongated or extending both in the first direction and the second direction. As will be described later in greater detail, the first protrusion 5 has a protrusion 14 provided on a shutter 13 described later, and a protrusion 16 provided on a second cover 15 described later. Note that the protrusion 14 may be configured of at least one of the protrusion 14 provided on the shutter 13 described later, and the protrusion 16 provided on the second cover 15 described later. Specifically, the protrusion 14 may be configured of the protrusion 14 provided on the shutter 13 described later. In this case, the toner cartridge 1 need not be provided with the second cover 15. Further, the protrusion 14 may be configured of the protrusion 16 provided on the second cover 15 described later. In this case, the toner cartridge 1 need not be provided with the shutter 13.

The second protrusion 6 is positioned on a second end portion of the toner cartridge 1 in the first direction. The second protrusion 6 is positioned on the end of the second toner-accommodating section 2B opposite the first protrusion 5 relative to the first direction. That is, the second protrusion 6 is positioned on the second end portion of the second toner-accommodating section 2B in the first direction. The second protrusion 6 extends in both the first direction and the second direction.

2. Detail of Toner Cartridge 1

Next, the toner cartridge 1 will be described in detail with reference to FIGS. 3 through 8.

2.1 Second Toner-Accommodating Section 2B

Figure 4:
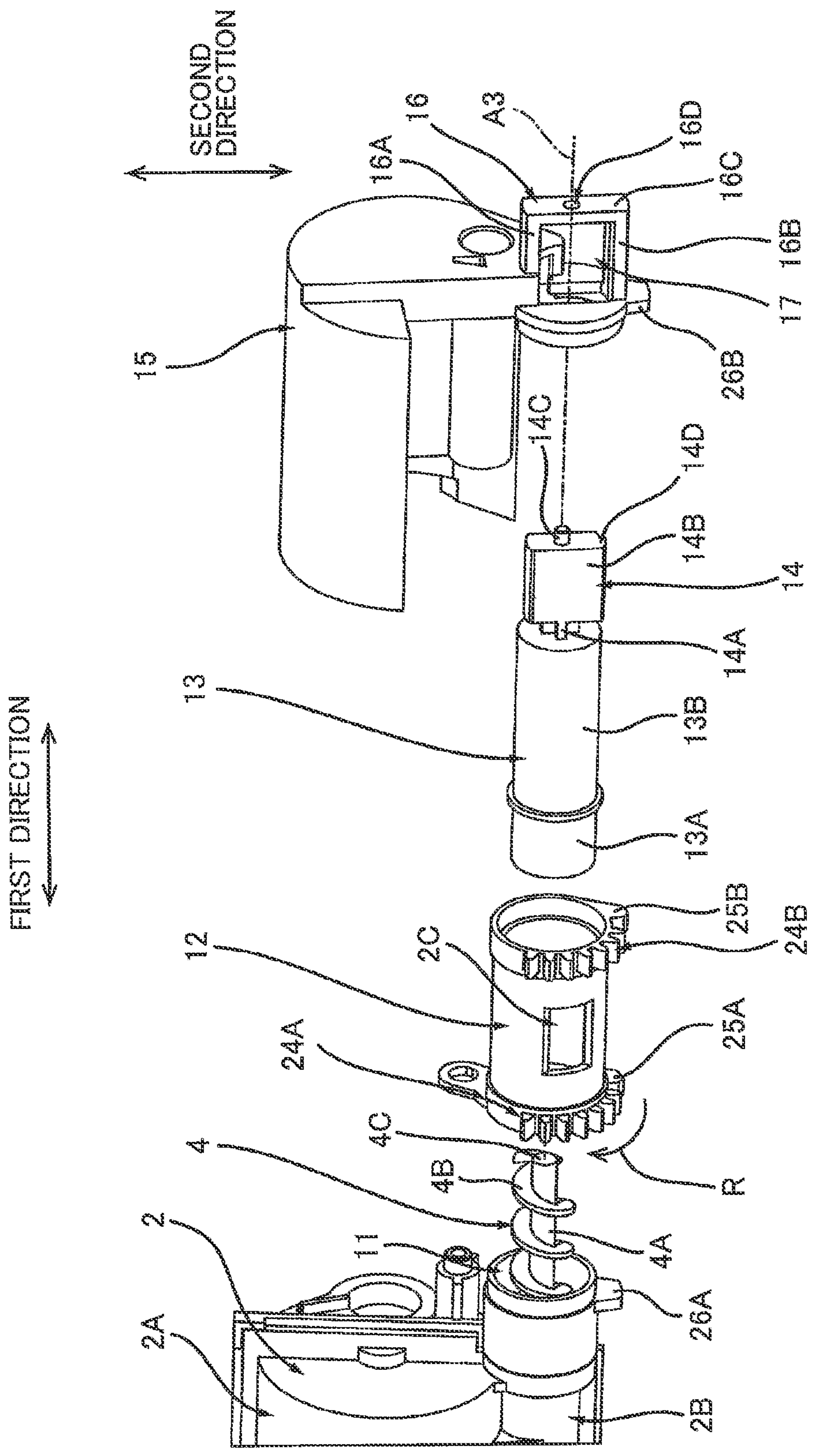
FIG. 4 is an exploded perspective view of a first end portion of the toner cartridge 1.

As shown in FIGS. 3 and 4, the second toner-accommodating section 2B has a third opening 11. The third opening 11 is formed in the first end portion of the second toner-accommodating section 2B. The first end portion of the second toner-accommodating section 2B protrudes farther in the first direction than the first end portion of the first toner-accommodating section 2A. That is, the length of the second toner-accommodating section 2B in the first direction is greater than the length of the first toner-accommodating section 2A in the first direction. Consequently, the length of the first interior space 2D in the first direction is shorter than the length of the second interior space 2E in the first direction. The first end portion of the second toner-accommodating section 2B has a cylindrical shape. The third opening 11 penetrates the first end portion of the second toner-accommodating section 2B in the first direction. The third opening 11 is in communication with the second interior space 2E, thereby allowing toner in the second interior space 2E to be discharged from the third opening 11. The auger 4 is also inserted through the third opening 11. The auger 4 has a first end portion 4C in the first direction, and a second end portion 4D separated from the first end portion 4C in the first direction. The first end portion 4C of the auger 4 protrudes out from the third opening 11 in the first direction. That is, the first end portion 4C of the auger 4 is exposed outside the second toner-accommodating section 2B through the third opening 11. With this configuration, the auger 4 can convey toner from the second interior space 2E to the third opening 11.

2.2 Cover 12

As shown in FIGS. 3 and 4, the housing 2 also includes a cover 12.

The cover 12 is positioned on the first end portion of the second toner-accommodating section 2B. Specifically, the cover 12 is assembled on the first end portion of the second toner-accommodating section 2B and can thereby move together with the housing 2. The cover 12 covers the first end portion of the second toner-accommodating section 2B. The cover 12 also covers the third opening 11. The cover 12 also covers the first end portion 4C of the auger 4. Specifically, the cover 12 covers the circumferential surface on the first end portion 4C of the auger 4. The cover 12 extends along the circumferential surface on the first end portion 4C of the auger 4. Specifically, the cover 12 has a cylindrical shape and is elongated in the first direction. The cover 12 includes the first opening 2C described above.

The first opening 2C is formed at a position separated from the second toner-accommodating section 2B in the first direction. Specifically, the first opening 2C is formed at a position separated from the third opening 11 in the first direction. The first opening 2C penetrates the circumferential surface of the cover 12, thereby allowing toner to be discharged from the cover 12. The area of the first opening 2C is smaller than the area of the third opening 11. Note that the auger 4 extends all the way to the first opening 2C in the first direction, thereby enabling the auger 4 to convey toner from the second interior space 2E to the first opening 2C.

2.3 Shutter 13

As shown in FIGS. 3 and 4, the toner cartridge 1 also includes a shutter 13.

The shutter 13 is positioned on the first end portion of the second toner-accommodating section 2B in the first direction. Specifically, the shutter 13 is inserted into the cover 12 and the first end portion of the second toner-accommodating section 2B. In this way, the shutter 13 is assembled on the first end portion of the second toner-accommodating section 2B. The shutter 13 can rotate from a closed position (see FIG. 6A) to an open position (see FIG. 6B). When in the closed position, the shutter 13 closes the first opening 2C. When in the open position, the shutter 13 opens the first opening 2C. Hence, the shutter 13 has a closed state for closing the first opening 2C (see FIG. 6A) and an open state for opening the first opening 2C (see FIG. 6B).

More specifically, the shutter 13 is elongated in the first direction. The shutter 13 has a first end portion and a second end. The first end portion of the shutter 13 is separated farther than the second end portion from the second toner-accommodating section 2B in the first direction. The shutter 13 includes an insertion part 13A, and a cover part 13B. The insertion part 13A is positioned on the second end portion of the shutter 13. The insertion part 13A is inserted into the third opening 11. The insertion part 13A has an opening 13C. The opening 13C penetrates the insertion part 13A in the first direction, thereby allowing toner in the second interior space 2E to be introduced into the interior space of the shutter 13. The cover part 13B is juxtaposed with the insertion part 13A in the first direction. The cover part 13B is positioned between the insertion part 13A and the protrusion 14 described later in the first direction. The cover part 13B protrudes through the third opening 11 in the first direction. The cover part 13B covers the outer circumferential surface on the first end portion 4C of the auger 4. The cover part 13B extends along the circumferential surface on the first end portion 4C of the auger 4. The cover part 13B also extends along the inner surface of the cover 12. In other words, the cover 12 extends along the outer circumferential surface of the cover part 13B and covers the outer circumferential surface of the cover part 13B. Specifically, the cover part 13B has a cylindrical shape and is elongated in the first direction. The cover part 13B has a second opening 13D (see FIG. 6B) as an example of a second opening portion. That is, the shutter 13 has the second opening 13D. The second opening 13D penetrates the circumferential surface of the cover part 13B. When the shutter 13 is in the open position, at least part of the second opening 13D overlaps at least part of the first opening 2C. In this way, the second opening 13D allows toner in the interior space of the shutter 13 to be discharged through the first opening 2C. Further, since at least part of the second opening 13D overlaps at least part of the first opening 2C when the shutter 13 is in the open position, the first end portion 4C of the auger 4 is exposed through the first opening 2C. That is, part of the circumferential surface on the first end portion 4C of the auger 4 in the first direction is exposed through the first opening 2C. Here, a seal S (see FIG. 16) is provided around the second opening 13D. The seal S is positioned between the inner circumferential surface of the cover 12 and the cover part 13B. With this configuration, the seal S prevents toner from entering between the inner surface of the cover 12 and the cover part 13B.

As shown in FIG. 4, the shutter 13 is provided with a protrusion 14.

The protrusion 14 is positioned farther away from the first end portion of the second toner-accommodating section 2B in the first direction than the cover 12. The protrusion 14 is positioned on the side of the cover part 13B opposite the insertion part 13A in the first direction. The protrusion 14 is fixed in position relative to the developing unit 31 described later (see FIG. 9) when the toner cartridge 1 is mounted in the developing unit 31. The protrusion 14 is elongated in the first direction. The protrusion 14 extends in the first direction from the shutter 13. Specifically, the protrusion 14 extends from the cover part 13B. Accordingly, the protrusion 14 can rotate together with the shutter 13 relative to the housing 2 and cover 12. The protrusion 14 has a proximal end and a distal end relative to the first direction. The proximal end is connected to the cover part 13B. The distal end is positioned on the side of the proximal end opposite the cover part 13B relative to the first direction. Specifically, the protrusion 14 includes a shaft part 14A, a flat plate part 14B, and a boss 14C. The shaft part 14A is positioned on the proximal end of the protrusion 14. The shaft part 14A extends in the first direction from the cover part 13B and is connected to the flat plate part 14B. The flat plate part 14B is positioned on the side of the shaft part 14A opposite the cover part 13B in the first direction. The flat plate part 14B extends in the second direction when the shutter 13 is in the closed position. In other words, the protrusion 14 extends in the second direction when the shutter 13 is in the closed position. The flat plate part 14B is longer in the second direction than the shaft part 14A. The boss 14C is positioned on the distal end of the protrusion 14. That is, the boss 14C is positioned on the side of the flat plate part 14B opposite the shaft part 14A in the first direction. The boss 14C extends in the first direction from the flat plate part 14B. The boss 14C is elongated along a third axis A3. Note that the third axis A3 may be aligned with the second axis A2. Further, the boss 14C has a cylindrical shape.

2.4 Second Cover 15.

As shown in FIG. 4, the toner cartridge 1 includes a second cover 15.

The second cover 15 is elongated in the first direction. The second cover 15 has a first end, and a second end. The first end is separated farther in the first direction from the housing 2 than the first end. The second end portion of the second cover 15 is attached to the first toner-accommodating section 2A. With this configuration, the second cover 15 can move together with the housing 2 and cover 12 relative to the shutter 13. The second cover 15 includes a protrusion 16.

The protrusion 16 is positioned on the first end portion of the second cover 15. The protrusion 16 protrudes in the first direction from the first end portion of the second cover 15. The protrusion 16 extends in the second direction. The protrusion 16 has a fourth opening 17. The fourth opening 17 penetrates the protrusion 16 in a direction orthogonal to the first and second directions. The protrusion 16 includes a first frame part 16A, a second frame part 16B, and a third frame part 16C. The first frame part 16A is separated from the second frame part 16B in the second direction. The fourth opening 17 is positioned between the first frame part 16A and second frame part 16B. The third frame part 16C is positioned on the side of the fourth opening 17 opposite the housing 2 relative to the first direction. The third frame part 16C extends in the second direction. The third frame part 16C is connected to the first frame part 16A and the second frame part 16B. The third frame part 16C has a through-hole 16D. The through-hole 16D penetrates the third frame part 16C in the first direction.

As shown in FIGS. 1 and 4, the protrusion 14 is inserted into the protrusion 16. This insertion results in the flat plate part 14B of the protrusion 14 being positioned between the first frame part 16A and second frame part 16B. The fourth opening 17 exposes the flat plate part 14B of the protrusion 14. With this configuration, the first frame part 16A and second frame part 16B cover the edges of the flat plate part 14B when the shutter 13 is in the closed position. Further, the third frame part 16C confronts the flat plate part 14B in the first direction. Accordingly, the third frame part 16C covers at least part of the distal end of the protrusion 14 in the first direction. Hence, the second cover 15 covers at least part of the distal end of the protrusion 14. Further, the boss 14C of the protrusion 14 is inserted through the through-hole 16D. In this way, the second cover 15 rotatably supports the distal end of the protrusion 14. Accordingly, the shutter 13 can rotate about the third axis A3 extending in the first direction.

Figure 7:
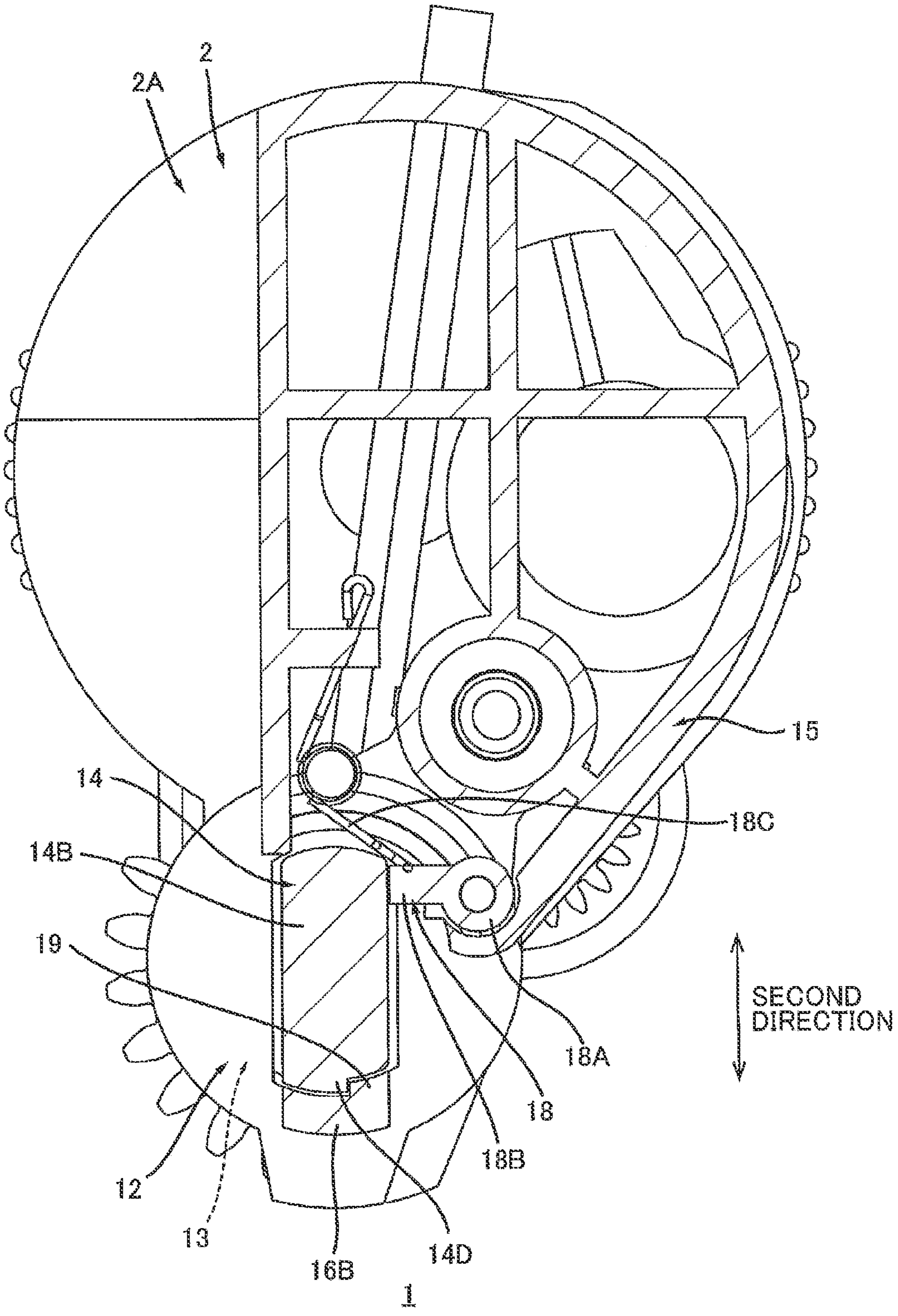
FIG. 7 is a cross-sectional view taken along a line A-A of FIG. 6A.

As shown in FIG. 7, the second cover 15 also includes a locking member 18, and a stopper 19.

Figure 15:
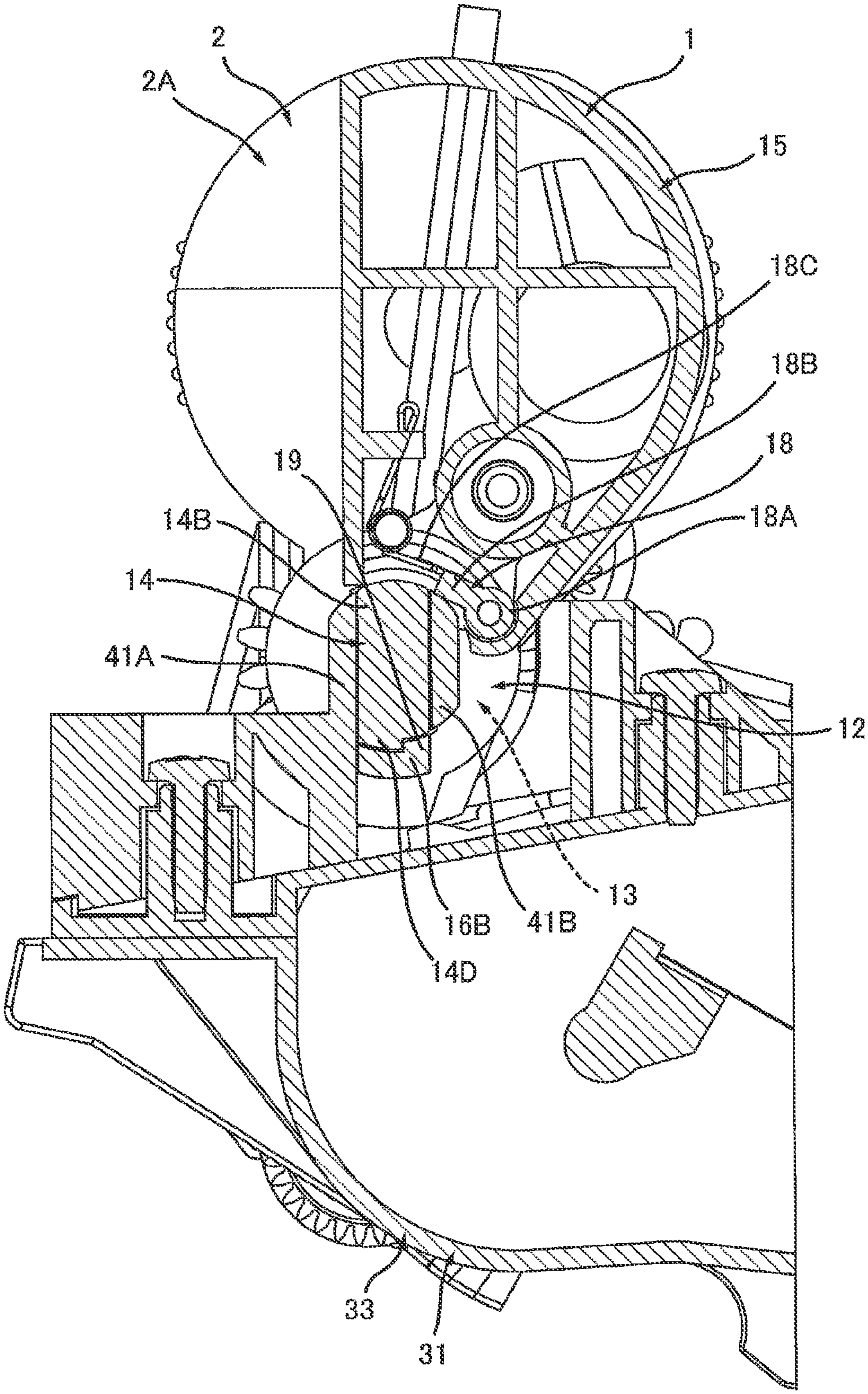
FIG. 15 is a cross-sectional view of the developing unit 31 and the toner cartridge 1 as illustrated in FIG. 13 taken along a line passing through a locking member 18 positioned at a release position.

The locking member 18 can move between a locking position (see FIG. 7) and a release position (see FIG. 15). Specifically, the locking member 18 can pivot between the locking position and the release position. A spring 18C presses the locking member 18 toward the locking position.

The locking member 18 includes a shaft 18A, and a protrusion 18B. The shaft 18A is rotatably supported by the second cover 15. Accordingly, the locking member 18 can pivot relative to the second cover 15. The protrusion 18B extends from the shaft 18A toward the protrusion 14. The protrusion 18B confronts a first end portion of the flat plate part 14B when the locking member 18 is in the locking position. The first end portion of the flat plate part 14B is the end that faces the first frame part 16A (see FIG. 1) in the second direction when the shutter 13 is in the closed position. The protrusion 18B contacts the first end portion of the protrusion 14. Thus, when in the locking position, the locking member 18 can lock the protrusion 14 to the second cover 15. Here, "locking the protrusion 14 to the second cover 15" denotes that the protrusion 14 is prevented from rotating relative to the second cover 15. By locking the protrusion 14 to the second cover 15 when the toner cartridge 1 is removed from the developing unit 31 described later, the locking member 18 prevents the shutter 13 from moving from the closed position to the open position. Further, when the locking member 18 is in the release position, the protrusion 18B cannot contact the first end portion of the flat plate part 14B. Accordingly, the protrusion 14 is no longer locked to the second cover 15 when the locking member 18 is in the release position.

The spring 18C is a coil spring. Specifically, the spring 18C includes a first end, a second end portion separated from the first end, and a coil part positioned between the first end portion and the second end. The first end portion of the spring 18C contacts the second cover 15, while the second end portion contacts the protrusion 18B of the locking member 18. With this configuration, the spring 18C presses the locking member 18 toward the locking position.

The stopper 19 is positioned on the inner surface of the second frame part 16B. The stopper 19 protrudes toward the first frame part 16A from the inner surface of the second frame part 16B. The stopper 19 faces a second end portion of the flat plate part 14B when the shutter 13 is in the closed position. The second end portion of the flat plate part 14B is the end that faces the second frame part 16B in the second direction when the shutter 13 is in the closed position. The second end portion of the flat plate part 14B has an engaging part 14D. The engaging part 14D protrudes in the second direction from the second end portion of the flat plate part 14B when the shutter 13 is in the closed position. The stopper 19 confronts and contacts the engaging part 14D. Accordingly, when the shutter 13 is in the closed position, the stopper 19 prevents the protrusion 14 from rotating in a direction opposite the direction in which the protrusion 14 rotates when the shutter 13 rotates from the closed position to the open position. If the protrusion 14 is rotated in the opposite direction when the shutter 13 is in the closed position, the engaging part 14D of the protrusion 14 contacts the stopper 19, preventing the protrusion 14 from rotating in the opposite direction.

2.5 Gear Train and Gear Cover 21

Figure 5:
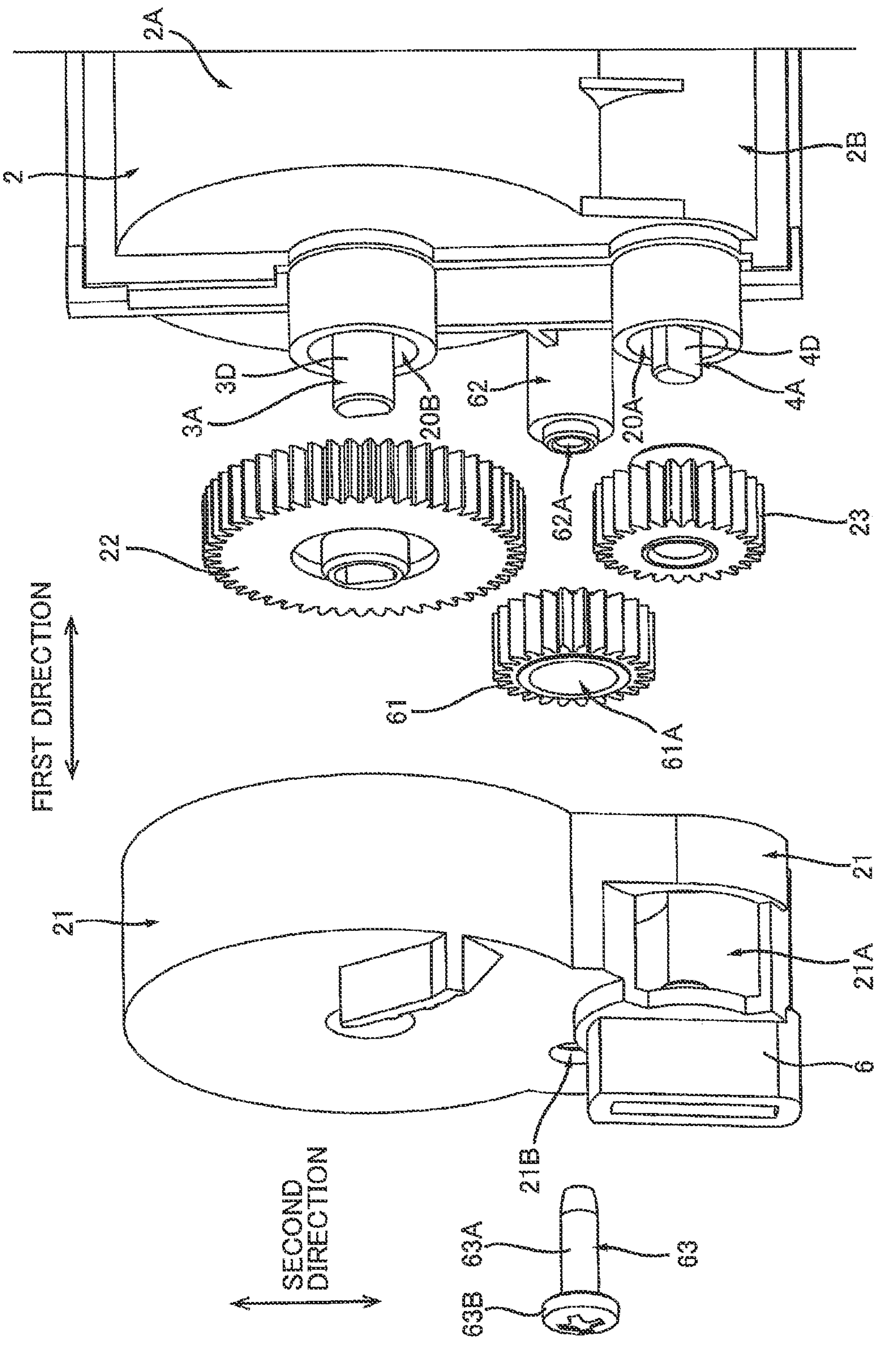
FIG. 5 is an exploded perspective view of a second end portion of the toner cartridge 1.
Figure 6A:
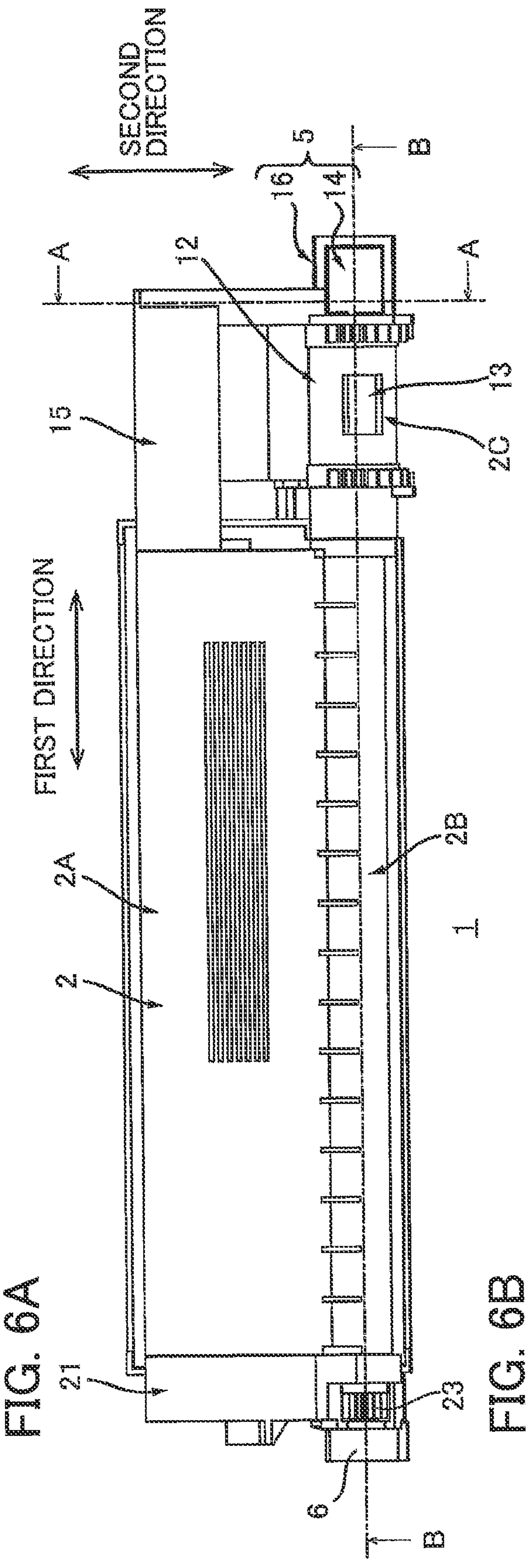
FIG. 6A is a side view of the toner cartridge 1 viewed in a direction crossing a second direction in a state where a shutter 13 is positioned at a closed position.
Figure 6B:
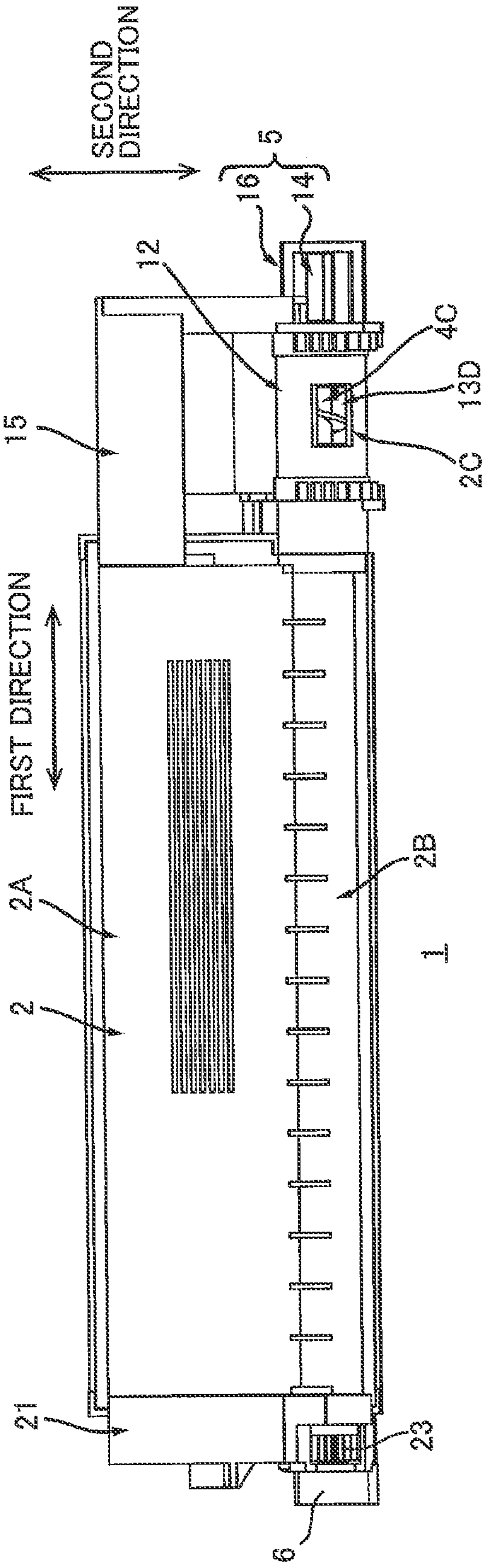
FIG. 6B is a side view of the toner cartridge 1 viewed in the direction crossing the second direction in a state where the shutter 13 is positioned at an open position.

As shown in FIGS. 3 and 5, the toner cartridge 1 also includes an auger gear 23, an agitator gear 22, an idle gear 61, and a gear cover 21.

2.5.1 Auger Gear 23

The auger gear 23 is mounted on the second end portion 4D of the auger 4. The auger gear 23 can rotate together with the auger 4 about the second axis A2. Specifically, the second toner-accommodating section 2B has a first through-hole 20A. The first through-hole 20A is positioned on the second end portion of the second toner-accommodating section 2B in the first direction. The first through-hole 20A penetrates the second toner-accommodating section 2B in the first direction. The second end portion 4D of the auger 4 is inserted through the first through-hole 20A. In this way, the second end portion 4D of the auger 4 penetrates the housing 2 in the first direction. The auger gear 23 is positioned on the outer surface of the second toner-accommodating section 2B.

2.5.2 Agitator Gear 22

The agitator gear 22 is mounted on the agitator 3. The agitator gear 22 can rotate together with the agitator 3 about the first axis A1. Specifically, the agitator shaft 3A has a first end portion 3C, and a second end portion 3D that is separated from the first end portion 3C in the first direction. The first toner-accommodating section 2A has a second through-hole 20B. The second through-hole 20B is formed in the second end portion of the first toner-accommodating section 2A in the first direction. The second through-hole 20B penetrates the first toner-accommodating section 2A in the first direction. The second end portion 3D is inserted through the second through-hole 20B. In this way, the second end portion 3D penetrates the housing 2 in the first direction. The agitator gear 22 is assembled on the second end portion 3D of the agitator 3. The agitator gear 22 is positioned on the outer surface of the first toner-accommodating section 2A. The agitator gear 22 is spaced apart from the auger gear 23. The agitator gear 22 has a larger diameter than that of the auger gear 23. The agitator gear 22 also has a larger diameter than that of the idle gear 61. Accordingly, the agitator 3 can rotate at a slower circumferential speed than the auger 4.

2.5.3 Idle Gear 61

The idle gear 61 is positioned between the agitator gear 22 and auger gear 23. The idle gear 61 meshes with the auger gear 23 and the agitator gear 22, whereby the auger gear 23 can transmit a drive force to the agitator gear 22 via the idle gear 61. Specifically, the idle gear 61 is meshed with a first side of the auger gear 23. Note that the second side of the auger gear 23 is exposed outside the gear cover 21 through an opening 21A (described later) formed in the gear cover 21. Hence, the idle gear 61 is positioned opposite to the second side with respect to the first side of the auger gear 23. Note that the second side of the auger gear 23 is meshed with a gear 30 of the developing unit 31 when the toner cartridge 1 is attached to the developing unit 31 and the housing 2 is in the second position relative to the developing unit 31. That is, when the toner cartridge 1 is attached to the developing unit 31 and the housing 2 is in the second position relative to the developing unit 31, the idle gear 61 is positioned opposite to the second side of the auger gear 23 with respect to the first side of the auger gear 23. In this way, the idle gear 61 can stably receive torque that the gear 30 of the developing unit 31 applies to the second side of the auger gear 23 from the first side of the auger gear 23, i.e., the side opposite the second side. The idle gear 61 can rotate about a second boss 62 provided on the housing 2. The second boss 62 is positioned between the agitator gear 22 and the auger gear 23. The second boss 62 is positioned on the first side of the auger gear 23, and in other words is positioned opposite to the second side with respect to the first side of the auger gear 23. The second boss 62 protrudes in the first direction from the outer surface of the first toner-accommodating section 2A. That is, the second boss 62 extends in the first direction from the housing 2. The second boss 62 has a columnar shape. The idle gear 61 has a through-hole 61A through which the second boss 62 is inserted. By inserting the second boss 62 through the through-hole 61A, the idle gear 61 can rotate about the second boss 62. Note that the second boss 62 may, but need not, penetrate the entire idle gear 61 through the through-hole 61A.

The second boss 62 has a distal end and a proximal end. The proximal end of the second boss 62 is connected to the housing 2. Specifically, the proximal end is connected to the outer surface of the first toner-accommodating section 2A. The distal end of the second boss 62 is positioned on the opposite to the housing 2 with respect to the proximal end in the first direction. The second boss 62 has a hole 62A formed in the distal end thereof. The hole 62A is recessed toward the proximal end from the distal end.

2.5.4 Gear Cover 21

The gear cover 21 is positioned on the side of the housing 2 opposite the cover 12 in the first direction. The gear cover 21 covers the agitator gear 22, the idle gear 61, and the first side of the auger gear 23. That is, the gear cover 21 covers at least part of the auger gear 23. The gear cover 21 has an opening 21A, and a through-hole 21B. The opening 21A exposes the second side of the auger gear 23. The opening 21A is positioned between the second protrusion 6 and the second toner-accommodating section 2B. The opening 21A penetrates the gear cover 21 in a third direction (see FIG. 8). The through-hole 21B is formed at a position aligned with the second boss 62 in the first direction. The through-hole 21B is positioned opposite to the opening 21A with respect to the second protrusion 6. The through-hole 21B penetrates the gear cover 21 in the first direction. The distal end of the second boss 62 is inserted into the through-hole 21B, whereby the distal end of the second boss 62 is exposed on the outside of the through-hole 21B. Inserting the second boss 62 into the through-hole 21B can fix the gear cover 21 relative to the second boss 62, thereby reliably fixing the gear cover 21 relative to the housing 2.

The toner cartridge 1 also includes a screw 63. The screw 63 has a shank 63A elongated in the first direction, and a head 63B positioned on a second end portion of the shank 63A. The diameter of the shank 63A is smaller than that of the through-hole 21B. The diameter of the head 63B is greater than that of the through-hole 21B. The shank 63A is inserted through the through-hole 21B into the hole 62A of the second boss 62. At this time, the head 63B confronts the edges of the through-hole 21B. The screw 63 fixes the gear cover 21 to the second boss 62.

2.5.5 Second Protrusion 6

The gear cover 21 is also provided with the second protrusion 6 described above.

The second protrusion 6 is positioned opposite to the second toner-accommodating section 2B with respect to the auger gear 23 in the first direction. The second protrusion 6 is separated farther than the auger gear 23 from the first opening 2C in the first direction. The second protrusion 6 extends from the gear cover 21 in the first direction.

Figure 8:
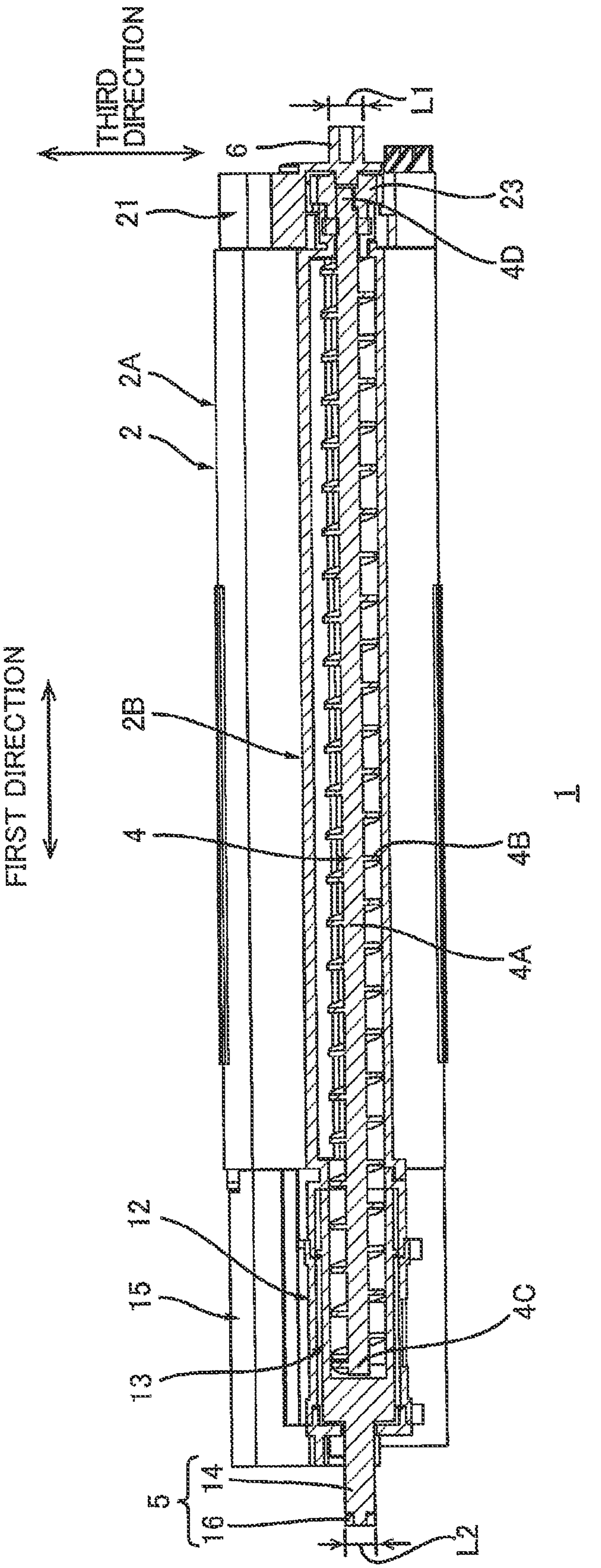
FIG. 8 is a cross-sectional view taken along a line B-B of FIG. 6A.

As shown in FIG. 8, the second protrusion 6 has a width L1 in the third direction intersecting the first and second directions that differs from a width L2 of the first protrusion 5 in the third direction. Note that the width of the protrusion 14 in the third direction is identical to the width of the protrusion 16 in the third direction. Specifically, the width L1 of the second protrusion 6 in the third direction is greater than the width L2 of the first protrusion 5 in the third direction. Consequently, the second protrusion 6 cannot be fitted into a groove 34 (described later) that conforms to the width L2 of the first protrusion 5. Accordingly, the user cannot mount the toner cartridge 1 in the developing unit 31 when the ends of the toner cartridge 1 are reversed in the first direction. Note that the width L1 of the second protrusion 6 in the third direction may be narrower than the width L2 of the first protrusion 5 in the third direction instead.

2.6 Gear Parts and Protrusions

As shown in FIGS. 1 and 4, the toner cartridge 1 also includes gear parts 24A and 24B, and protrusions 25A, 25B, 26A, and 26B. The gear parts 24A and 24B and the protrusions 25A, 25B, 26A, and 26B are configured for moving a developing shutter 51 of the developing unit 31 described later.

The cover 12 is further provided with the gear parts 24A and 24B. The gear part 24A is separated from the gear part 24B in the first direction. The first opening 2C is positioned between the gear parts 24A and 24B. The gear parts 24A and 24B each has a plurality of gear teeth. Hence, the cover 12 has pluralities of gear teeth. The gear teeth on the gear part 24A and the gear teeth on the gear part 24B are positioned on the outer circumferential surface of the cover 12. Specifically, the gear teeth on the gear parts 24A and 24B are positioned on the circumferential surface along the direction in which the cover 12 rotates relative to the shutter 13. The gear teeth on the gear part 24A and the gear teeth on the gear part 24B are juxtaposed in the rotating direction of the cover 12. Further, the gear teeth on the gear part 24A and the gear teeth on the gear part 24B are juxtaposed along the rotating direction of the auger 4.

The cover 12 is further provided with the protrusions 25A and 25B. The protrusion 25A is separated from the protrusion 25B in the first direction. The protrusion 25A is juxtaposed with the gear teeth on the gear part 24A in the direction that the cover 12 rotates relative to the shutter 13. The protrusion 25A is positioned on the upstream side of the gear teeth on the gear part 24A in the rotating direction R of the cover 12 when the housing 2 rotates relative to the developing unit 31 from the second position (see FIG. 24) to the first position (see FIG. 13). The protrusion 25A is juxtaposed with the gear teeth on the gear part 24A and is spaced apart from the gear teeth on the gear part 24A by a gap larger than the gap between the gear teeth themselves in the rotating direction R of the cover 12. Specifically, the gap between the protrusion 25A and gear part 24A in the rotating direction R of the cover 12 is the pitch of the gear teeth on the gear part 24A. The protrusion 25B is positioned on the upstream side of the gear teeth on the gear part 24B in the rotating direction R of the cover 12 when the housing 2 is rotating relative to the developing unit 31 from the second position to the first position. The protrusion 25B is spaced apart from the gear teeth on the gear part 24B by a gap greater than the gap between the gear teeth themselves. Specifically, the gap between the protrusion 25B and gear part 24B in the rotating direction R of the cover 12 is the pitch of the gear teeth on the gear part 24B. The protrusions 25A and 25B protrude opposite to the first toner-accommodating section 2A with respect to the second toner-accommodating section 2B in the second direction.

The protrusion 26A is positioned opposite to the first opening 2C with respect to the protrusion 25A in the first direction. The protrusion 26B is positioned opposite the first opening 2C with respect to the protrusion 25B in the first direction. The protrusion 26A is positioned on the first end portion of the second toner-accommodating section 2B. The protrusion 26B is positioned on the first end portion of the second cover 15. The protrusions 26A and 26B protrude opposite the first toner-accommodating section 2A in the second direction with respect to the second toner-accommodating section 2B.

3. Detail of Developing Unit 31

Figure 9:
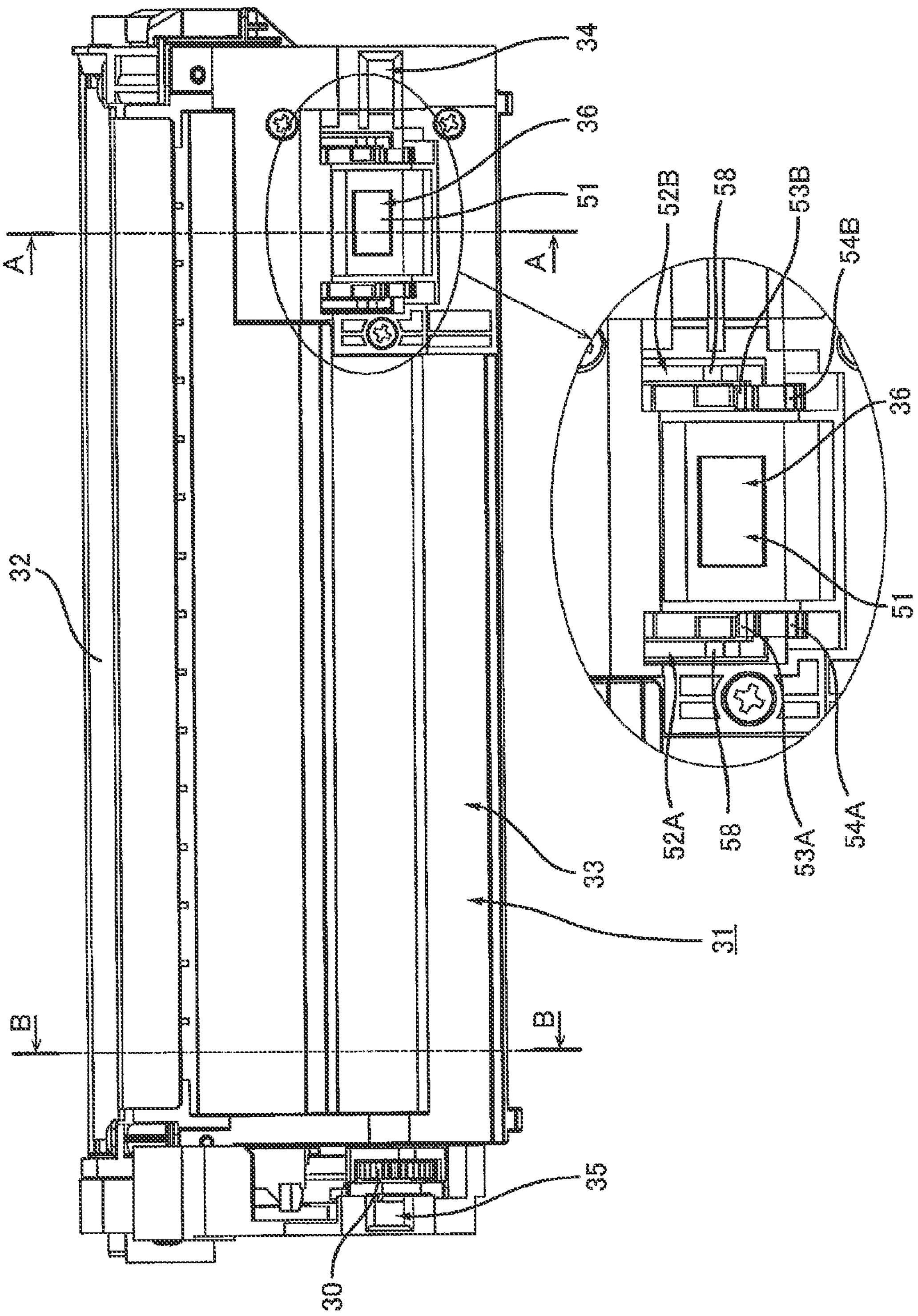
FIG. 9 is a side view of a developing unit 31 viewed in a mounting direction of the toner cartridge 1 to the developing unit 31.
Figure 10:
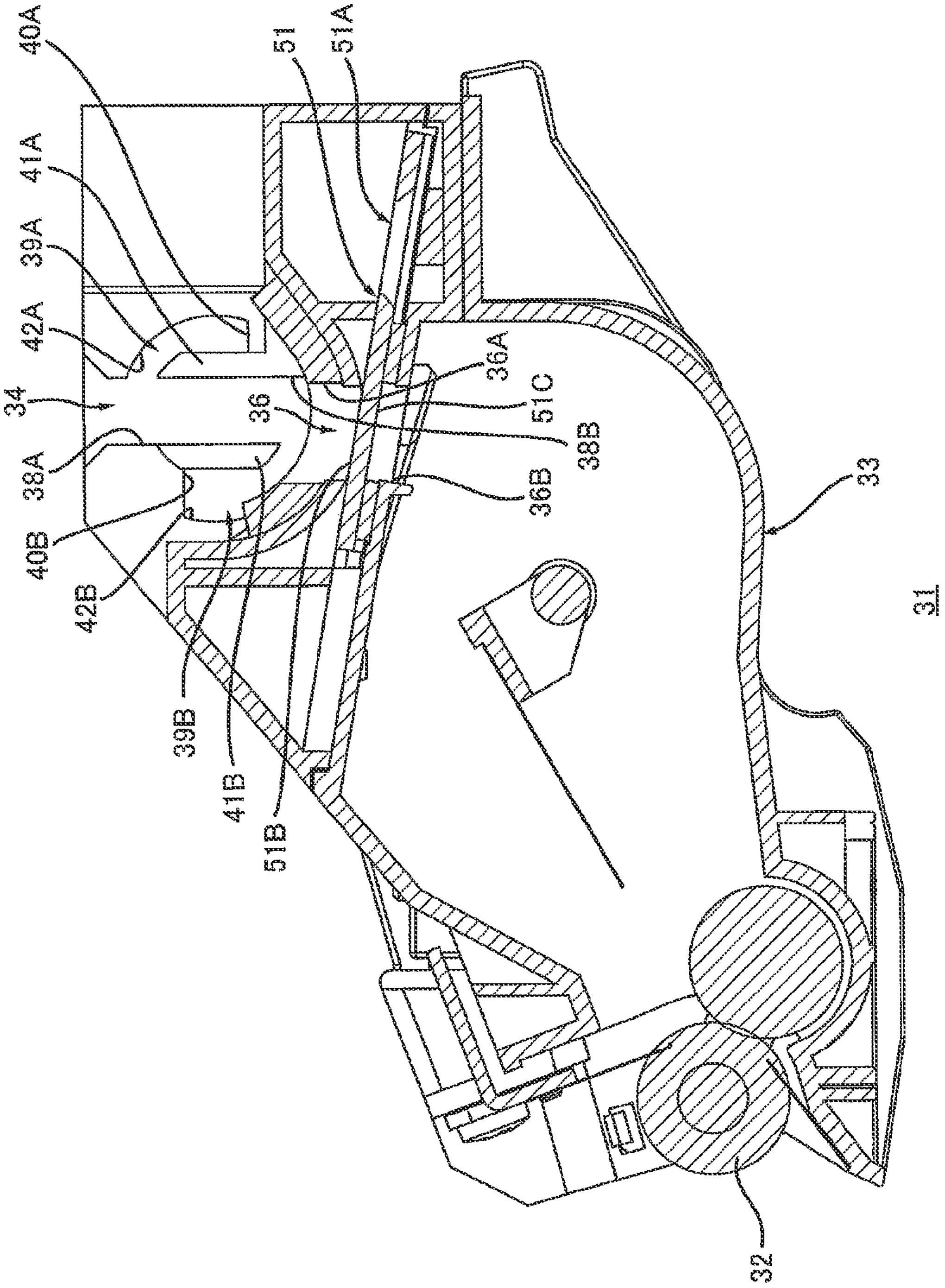
FIG. 10 is a cross-sectional view of the developing unit 31 taken along a line A-A of FIG. 9, viewed in a direction toward a groove 34 along a first direction.
Figure 11:
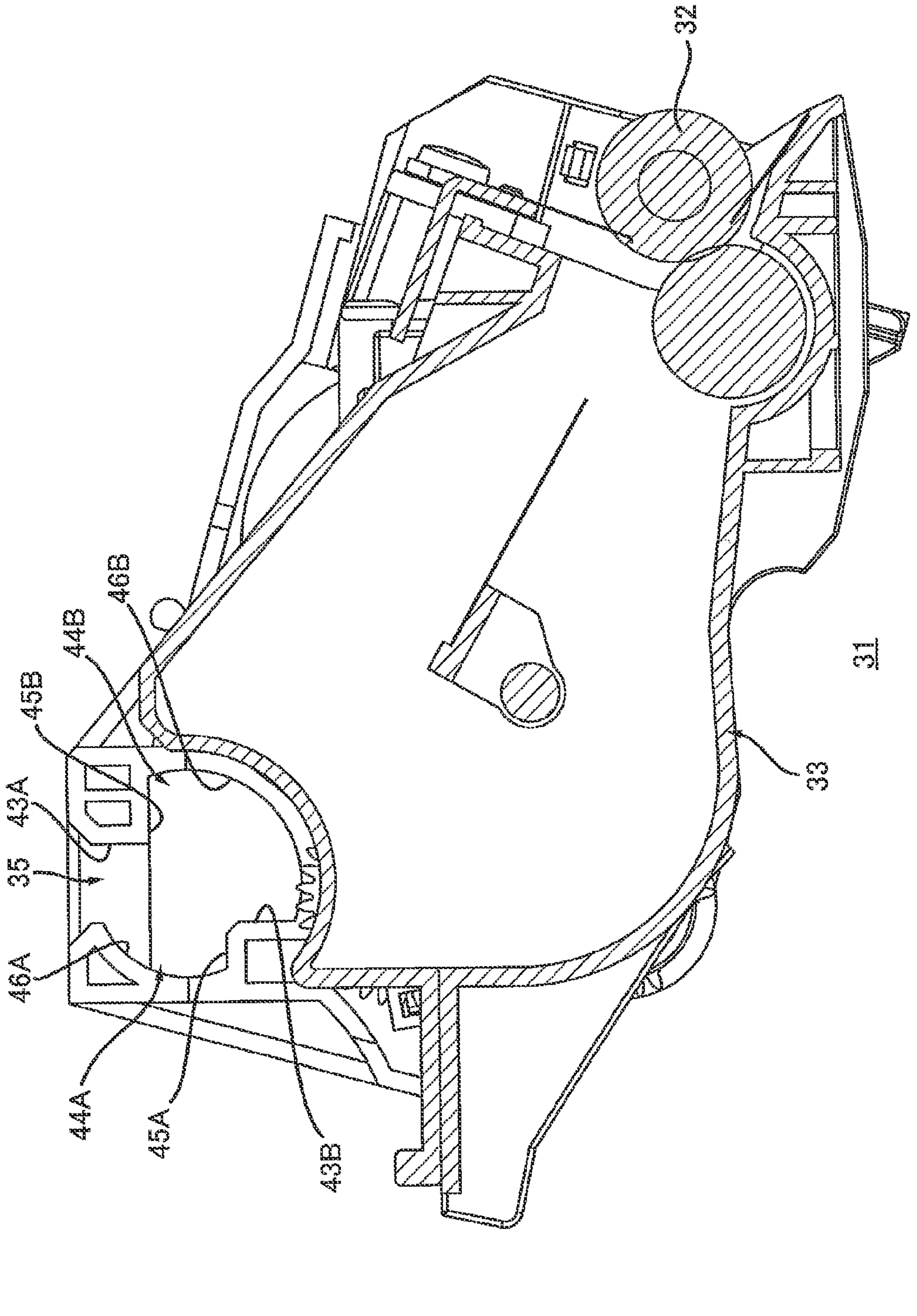
FIG. 11 is a cross-sectional view of the developing unit 31 taken along a line B-B of FIG. 9, viewed in a direction toward a groove 35 along the first direction.

FIGS. 9 through 11 show a developing unit 31 that is configured to receive toner supplied from the toner cartridge 1. The developing unit 31 is configured to develop images using toner supplied from the toner cartridge 1, for example. In the preferred embodiment, the developing unit 31 includes a developing roller 32. The developing unit 31 may also be provided with a photosensitive member. The developing unit 31 may be a cartridge-type developing unit that is detachably mountable in an image-forming apparatus. The developing roller 32 is elongated in the first direction. The developing roller 32 can contact a photosensitive member. The developing unit 31 also includes a toner-accommodating section 33. The toner-accommodating section 33 can accommodate toner.

The developing unit 31 also has grooves 34 and 35, and a developer opening 36.

The groove 34 is formed on a first end portion of the developing unit 31 in the first direction, while the groove 35 is formed on a second end portion of the developing unit 31 relative to the first direction. The groove 35 is separated from the groove 34 in the first direction. Next, the grooves 34 and 35 will be described in greater detail.

3.1 Groove 34

As shown in FIGS. 10 and 13, the groove 34 is elongated in a mounting direction along which the toner cartridge 1 is mounted in the developing unit 31, i.e., the direction indicated by the arrow in FIG. 12. The groove 34 has an upstream end portion in the mounting direction, and a downstream end portion opposite the upstream end portion in the mounting direction. The upstream end portion of the groove 34 is separated farther than the downstream end portion from the developer opening 36 in the mounting direction. Further, the groove 34 has sufficient width in a direction intersecting the mounting direction for receiving the first protrusion 5 on the toner cartridge 1 (see FIG. 1). More specifically, the groove 34 has the same width as the first protrusion 5 in the direction intersecting the mounting direction. The groove 34 includes flat surfaces 38A and 38B, recessed parts 39A and 39B, and protrusions 41A and 41B.

3.1.1 Flat Surface 38A and Flat Surface 38B

The flat surface 38A is positioned on the upstream end portion of the groove 34, and the flat surface 38B is positioned on the downstream end portion of the groove 34. Both the flat surfaces 38A and 38B extend in the mounting direction. When the toner cartridge 1 is mounted in the developing unit 31, the flat surface 38A confronts the first frame part 16A of the protrusion 16 (see FIG. 1) and the flat surface 38B confronts the second frame part 16B of the protrusion 16. When the housing 2 is pivoted relative to the developing unit 31 from the second position (see FIG. 24) to the first position (see FIG. 13), at least one of the flat surfaces 38A and 38B contacts the protrusion 16 and maintains the housing 2 in the first position.

3.1.2 Recessed Parts 39A and 39B

As shown in FIGS. 10, 13, 23, and 24, the recessed part 39A is recessed away from the flat surface 38A in the width direction of the groove 34, and the recessed part 39B is recessed away from the flat surface 38B in the width direction of the groove 34. The recessed part 39A has an arcuate surface 42A, and a flat surface 40A. The recessed part 39*b* has an arcuate surface 42B, and a flat surface 40B. The arcuate surface 42A extends along the direction in which the first frame part 16A moves relative to the flat surface 38A when the housing 2 pivots relative to the developing unit 31 from the first position to the second position. The arcuate surface 42B extends along a direction in which the second frame part 16B moves relative to the flat surface 38B when the housing 2 pivots relative to the developing unit 31 from the first position to the second position. The flat surface 40A is positioned on the downstream end portion of the arcuate surface 42A relative to the direction in which the first frame part 16A moves when the housing 2 pivots relative to the developing unit 31 from the first position to the second position. The flat surface 40B is positioned on the downstream end portion of the arcuate surface 42B relative to the direction in which the second frame part 16B moves when the housing 2 pivots relative to the developing unit 31 from the first position to the second position. Both of the flat surfaces 40A and 40B extend in a direction intersecting the mounting direction. Specifically, the flat surfaces 40A and 40B extend in a direction orthogonal to the mounting direction. When the housing 2 pivots from the first position to the second position relative to the developing unit 31, at least one of the flat surfaces 40A and 40B contacts the protrusion 16 and halts the housing 2 in the second position.

3.1.3 Protrusions 41A and 41B

The protrusions 41A and 41B are positioned between the arcuate surfaces 42A and 42B in the width direction of the groove 34. The protrusion 41A is positioned between the arcuate surface 42A and the protrusion 41B in the width direction of the groove 34, and the protrusion 41B is positioned between the arcuate surface 42B and the protrusion 41A in the width direction of the groove 34. The protrusion 41B is separated from the protrusion 41A in the width direction of the groove 34. Both the protrusions 41A and 41B extend in the mounting direction. When the toner cartridge 1 is mounted in the developing unit 31, the flat plate part 14B (see FIG. 15) is positioned between the protrusions 41A and 41B. When the toner cartridge 1 is mounted in the developing unit 31, the protrusions 41A and 41B contact the flat plate part 14B. Thus, the protrusions 41A and 41B having this configuration stop the protrusion 14 from rotating when the toner cartridge 1 is mounted in the developing unit 31, thereby fixing the shutter 13 in position relative to the developing unit 31.

When the toner cartridge 1 is mounted in the developing unit 31, the protrusions 41A and 41B do not contact the first frame part 16A, second frame part 16B, and third frame part 16C (see FIG. 1) in the width direction of the groove 34. Therefore, when the toner cartridge 1 is mounted in the developing unit 31, the first frame part 16A, second frame part 16B, and third frame part 16C can rotate relative to the shutter 13 while the shutter 13 is fixed relative to the developing unit 31. In this way, the housing 2 can pivot together with the cover 12 and second cover 15 relative to the developing unit 31, while the shutter 13 is fixed relative to the developing unit 31. Pivoting the housing 2 together with the cover 12 and second cover 15 from the first position (see FIG. 13) to the second position (see FIG. 24) relative to the developing unit 31 places the shutter 13 in the open position relative to the housing 2. When the shutter 13 is in the open position (see FIG. 27), at least part of the second opening 13D overlaps at least part of the first opening 2C, thereby opening the first opening 2C.

Note that the protrusion 41A is separated from the arcuate surface 42A in a radial direction of the arcuate surface 42A. The gap between the protrusion 41A and arcuate surface 42A is greater than the dimension of the first frame part 16A (see FIG. 1) in the mounting direction. Thus, the first frame part 16A can pass between the protrusion 41A and arcuate surface 42A when the housing 2 pivots relative to the developing unit 31. Similarly, the protrusion 41B is separated from the arcuate surface 42B in a radial direction of the arcuate surface 42B. The gap between the protrusion 41B and arcuate surface 42B is greater than the dimension of the second frame part 16B (see FIG. 1) in the mounting direction. Thus, the second frame part 16B can pass between the protrusion 41B and arcuate surface 42B when the housing 2 pivots relative to the developing unit 31.

3.2 Groove 35

As shown in FIG. 11, the groove 35 is elongated in the mounting direction. The groove 35 has an upstream end portion and a downstream end portion in the mounting direction. The upstream end portion of the groove 35 is separated farther than the downstream end portion from the toner-accommodating section 33 in the mounting direction. The groove 35 also has sufficient width in a direction intersecting the mounting direction (referred to as an intersecting direction) for receiving the second protrusion 6 of the toner cartridge 1 (see FIG. 1). Specifically, the groove 35 has the same width in the intersecting direction as the second protrusion 6 of the toner cartridge 1. The groove 35 includes flat surfaces 43A and 43B, and recessed parts 44A and 44B.

3.2.1 Flat Surface 43A and 43B

The flat surface 43A is positioned on the upstream part of the groove 35. The flat surface 43B is positioned on the downstream part of the groove 35. The flat surfaces 43A and 43B both extend in the mounting direction. When the toner cartridge 1 is mounted in the developing unit 31, the flat surface 43A faces a first end portion or upstream end portion of the second protrusion 6 in the mounting direction). When the toner cartridge 1 is mounted in the developing unit 31, the flat surface 43B confronts a second end portion or downstream end portion of the second protrusion 6 in the mounting direction. When the housing 2 is pivoted from the second position to the first position relative to the developing unit 31, at least one of the flat surfaces 43A and 43B contacts the second protrusion 6 and halts the housing 2 in the first position.

3.2.2 Recessed Parts 44A and 44B

The recessed part 44A is recessed away from the flat surface 43A in the width direction of the groove 35. The recessed part 44B is recessed away from the flat surface 43B in the width direction of the groove 35. The recessed part 44A has an arcuate surface 46A, and a flat surface 45A. The recessed part 44B has an arcuate surface 46B, and a flat surface 45B. The arcuate surface 46A extends along the direction that the upstream end portion of the second protrusion 6 moves relative to the flat surface 43A when the housing 2 pivots from the first position to the second position relative to the developing unit 31. The arcuate surface 46B extends along the direction that the downstream end portion of the second protrusion 6 moves relative to the flat surface 45B when the housing 2 pivots from the first position to the second position relative to the developing unit 31. The flat surface 45A is positioned on the downstream end portion of the arcuate surface 46A in the direction that the upstream end portion of the second protrusion 6 moves when the housing 2 pivots from the first position to the second position relative to the developing unit 31. The flat surface 45B is positioned on the downstream end portion of the arcuate surface 46B in the direction that the downstream end portion of the second protrusion 6 moves when the housing 2 pivots from the first position to the second position relative to the developing unit 31. The flat surfaces 45A and 45B extend in a direction that intersects the mounting direction. Specifically, the flat surfaces 45A and 45B extend in a direction orthogonal to the mounting direction. When the housing 2 pivots from the first position to the second position relative to the developing unit 31, at least one of the flat surfaces 45A and 45B contacts the second protrusion 6 and halts the housing 2 in the second position.

3.3 Developer Opening 36

As shown in FIG. 9, the developer opening 36 is positioned between the grooves 34 and 35 in the first direction. The developer opening 36 is positioned closer to the groove 34 than is to the center of the developing unit 31 in the first direction. As shown in FIG. 10, the developer opening 36 penetrates the outer surface of the toner-accommodating section 33 in the mounting direction. The developer opening 36 has an upstream end portion 36A in the mounting direction that is exposed on the outer surface of the toner-accommodating section 33, and a downstream end portion 36B that communicates with the interior space of the toner-accommodating section 33.

3.4 Developing Shutter 51

As shown in FIGS. 9 and 10, the developing unit 31 also includes a developing shutter 51.

The developing shutter 51 is positioned between the upstream end portion 36A and downstream end portion 36B of the developer opening 36 in the mounting direction. The developing shutter 51 has a first surface 51B, and a second surface 51C. The first surface 51B is positioned closer to the upstream end portion 36A than the downstream end portion 36B of the developer opening 36 in the mounting direction. The second surface 51C is positioned closer to the downstream end portion 36B of the developer opening 36 than the first surface 51B in the mounting direction. The developing shutter 51 can move between a closed position (see FIG. 16) for closing the developer opening 36, and an open position (see FIG. 27) for opening the developer opening 36. The developing shutter 51 also has an opening 51A. The opening 51A penetrates the developing shutter 51 in the mounting direction. When the developing shutter 51 is in the open position shown in FIG. 27, the opening 51A overlaps at least part of the developer opening 36. Accordingly, when the developing shutter 51 is in the open position, the opening 51A allows toner in the toner cartridge 1 to enter the toner-accommodating section 33 through the developer opening 36.

Figure 18:
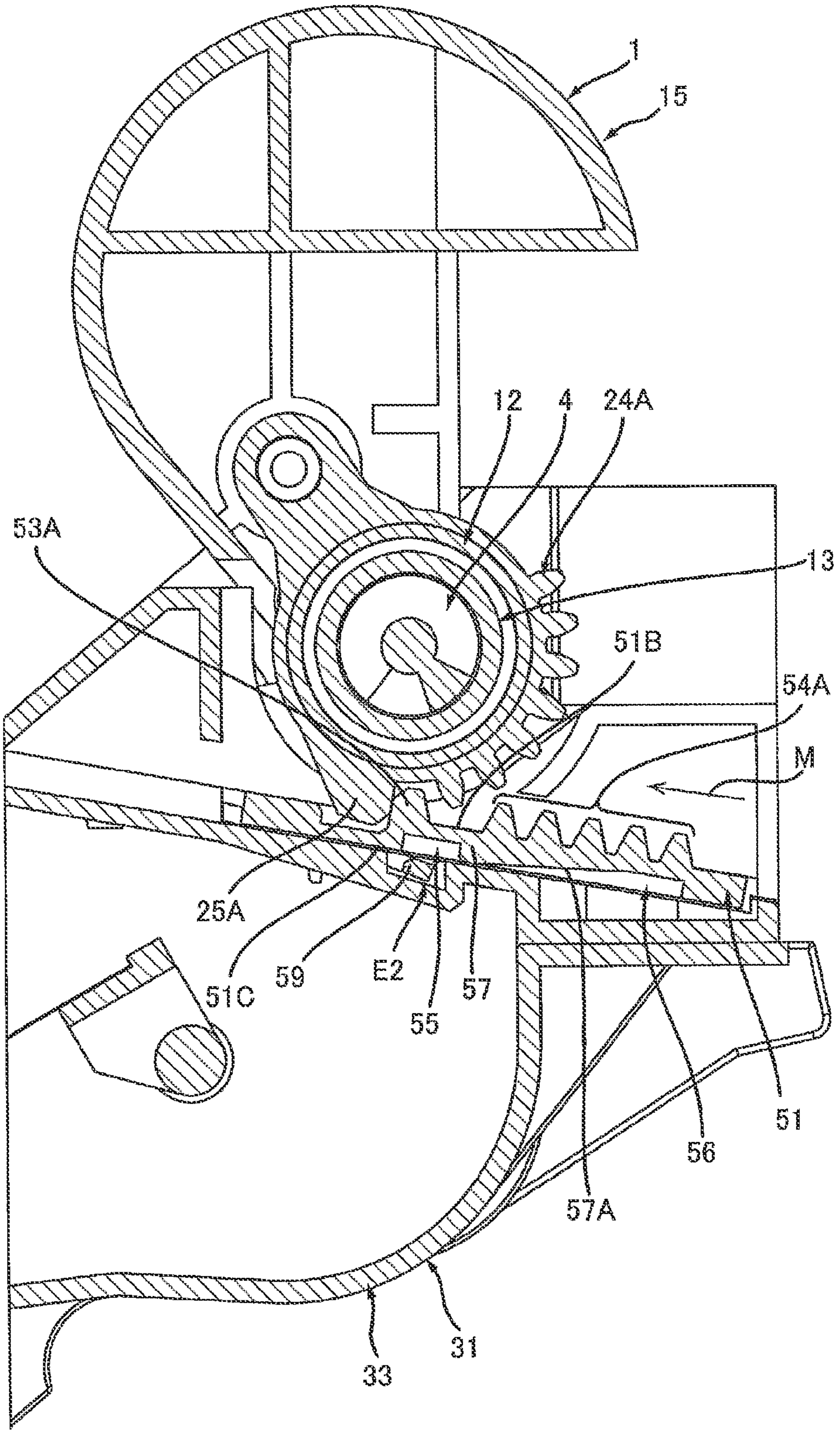
FIG. 18 is a cross-sectional view of the developing unit 31 and the toner cartridge 1 as illustrated in FIG. 13 taken along a line passing through a gear part 54A of the developing shutter 51, which illustrates a state where the housing 2 is at the first position and a protrusion 53A of the developing shutter 51 is positioned between a protrusion 25A and a gear part 24A.

As shown in FIGS. 9 and 18, the developing shutter 51 also includes protrusions 53A and 53B, and gear parts 54A and 54B.

The protrusion 53A is configured to contact the gear part 24A (see FIG. 19) when the toner cartridge 1 is mounted in the developing unit 31 and the housing 2 is pivoted from the first position to the second position relative to the developing unit 31. The protrusion 53B is configured to contact the gear part 24B (see FIG. 1) when the toner cartridge 1 is mounted in the developing unit 31 and the housing 2 is pivoted from the first position to the second position relative to the developing unit 31. When the housing 2 is pivoted from the first position to the second position relative to the developing unit 31, the first gear tooth among the plurality of gear teeth on the gear part 24A presses against the protrusion 53A while the first gear tooth among the plurality of gear teeth on the gear part 24B presses against the protrusion 53B, causing the developing shutter 51 to begin moving from the closed position toward the open position. Subsequently, the remaining gear teeth on the gear part 24A mesh with the gear part 54A while the remaining gear teeth on the gear part 24B mesh with the gear part 54B.

Further, the protrusion 53A is configured to contact the protrusion 25A (see FIG. 18) when the housing 2 is pivoted from the second position to the first position relative to the developing unit 31. The protrusion 53B is configured to contact the protrusion 25B (see FIG. 1) when the housing 2 is pivoted from the second position to the first position relative to the developing unit 31. When the housing 2 is pivoted from the second position to the first position relative to the developing unit 31, the gear part 24A separates from the gear part 54A and the gear part 24B separates from the gear part 54B. Subsequently, the protrusion 25A presses against the protrusion 53A and the protrusion 25B presses against the protrusion 53B, placing the developing shutter 51 in the closed position. Further, when the toner cartridge 1 is mounted in the developing unit 31, the gear part 54A meshes with the gear part 24A of the toner cartridge 1 (see FIG. 22). Further, when the toner cartridge 1 is mounted in the developing unit 31, the gear part 54B meshes with the gear part 24B of the toner cartridge 1 (see FIG. 1).

The protrusion 53A is positioned opposite the groove 34 with respect to the developer opening 36 in the first direction. The protrusion 53B is positioned between the developer opening 36 and groove 34 in the first direction. The protrusions 53A and 53B are disposed on the first surface 51B of the developing shutter 51 and protrude from the first surface 51B. When the developing shutter 51 is in the closed position, the protrusions 53A and 53B are exposed on the outer surface of the toner-accommodating section 33.

The gear part 54A is positioned on the upstream side of the protrusion 53A in a moving direction M of the developing shutter 51. Here, the moving direction M of the developing shutter 51 is the direction that the developing shutter 51 moves from the closed position to the open position. The gear part 54A is positioned apart from the protrusion 53A in the moving direction M of the developing shutter 51. The gear part 54B is positioned on the upstream side of the protrusion 53B in the moving direction M of the developing shutter 51. The gear part 54B is positioned apart from the protrusion 53B in the moving direction M. Both the gear parts 54A and 54B have a plurality of gear teeth arranged along the moving direction M of the developing shutter 51.

As shown in FIGS. 18, 20, 22, and 26, the developing shutter 51 further includes recessed parts 55 and 56, and a protrusion 57. The recessed part 55 is configured to receive protrusions 59, described later, when the toner cartridge 1 is removed from the developing unit 31 and the developing shutter 51 is in the closed position. The protrusion 57 is configured to contact the protrusions 59 fitted in the recessed part 55 when the toner cartridge 1 is removed from the developing unit 31 and the developing shutter 51 in the closed position moves toward the open position, and is configured to stop the developing shutter 51 from moving from the closed position to the open position. The recessed part 56 is configured to receive the protrusions 59 when the toner cartridge 1 is attached to the developing unit 31 and the developing shutter 51 is in the open position. The recessed part 55, recessed part 56, and protrusion 57 are positioned on the second surface 51C of the developing shutter 51. The recessed part 56 is positioned on the upstream side of the recessed part 55 in the moving direction M of the developing shutter 51, i.e., the direction in which the developing shutter 51 moves from the closed position to the open position. The protrusion 57 is positioned between the recessed part 55 and recessed part 56 in the moving direction M of the developing shutter 51. The recessed part 55 is recessed toward the first surface 51B of the developing shutter 51 from the second surface 51C. The recessed part 56 is also recessed toward the first surface 51B of the developing shutter 51 from the second surface 51C. The protrusion 57 protrudes in a direction corresponding to the direction from the first surface 51B toward the second surface 51C. The protrusion 57 has a sloped surface 57A. The sloped surface 57A slopes toward the first surface 51B of the developing shutter 51 from the recessed part 55 toward the recessed part 56.

3.5 Locking Member

As shown in FIG. 9, the developing unit 31 is also provided with locking members 52A and 52B.

The locking members 52A and 52B are configured to lock the developing shutter 51 in the closed position when the toner cartridge 1 is removed from the developing unit 31. Here, locking the developing shutter 51 in the closed position signifies that the developing shutter 51 is stopped from moving from the closed position to the open position. The locking member 52A engages with a second end of the developing shutter 51 in the first direction when the toner cartridge 1 is removed from the developing unit 31 and the developing shutter 51 is placed in the closed position. The locking member 52B engages with a first end portion of the developing shutter 51 in the first direction when the toner cartridge 1 is removed from the developing unit 31 and the developing shutter 51 is placed in the closed position. The first end portion of the developing shutter 51 is positioned closer than the second end portion to the groove 34 in the first direction.

The locking member 52A is positioned opposite to the groove 34 with respect to the developing shutter 51 in the first direction. The locking member 52B is positioned between the developing shutter 51 and the groove 34 in the first direction. The locking member 52B is separated from the locking member 52A in the first direction. The developing shutter 51 is positioned between the locking members 52A and 52B in the first direction. The locking members 52A and 52B are exposed on the outer surface of the toner-accommodating section 33. The locking members 52A and 52B are elongated in the moving direction M of the developing shutter 51.

Figure 17:
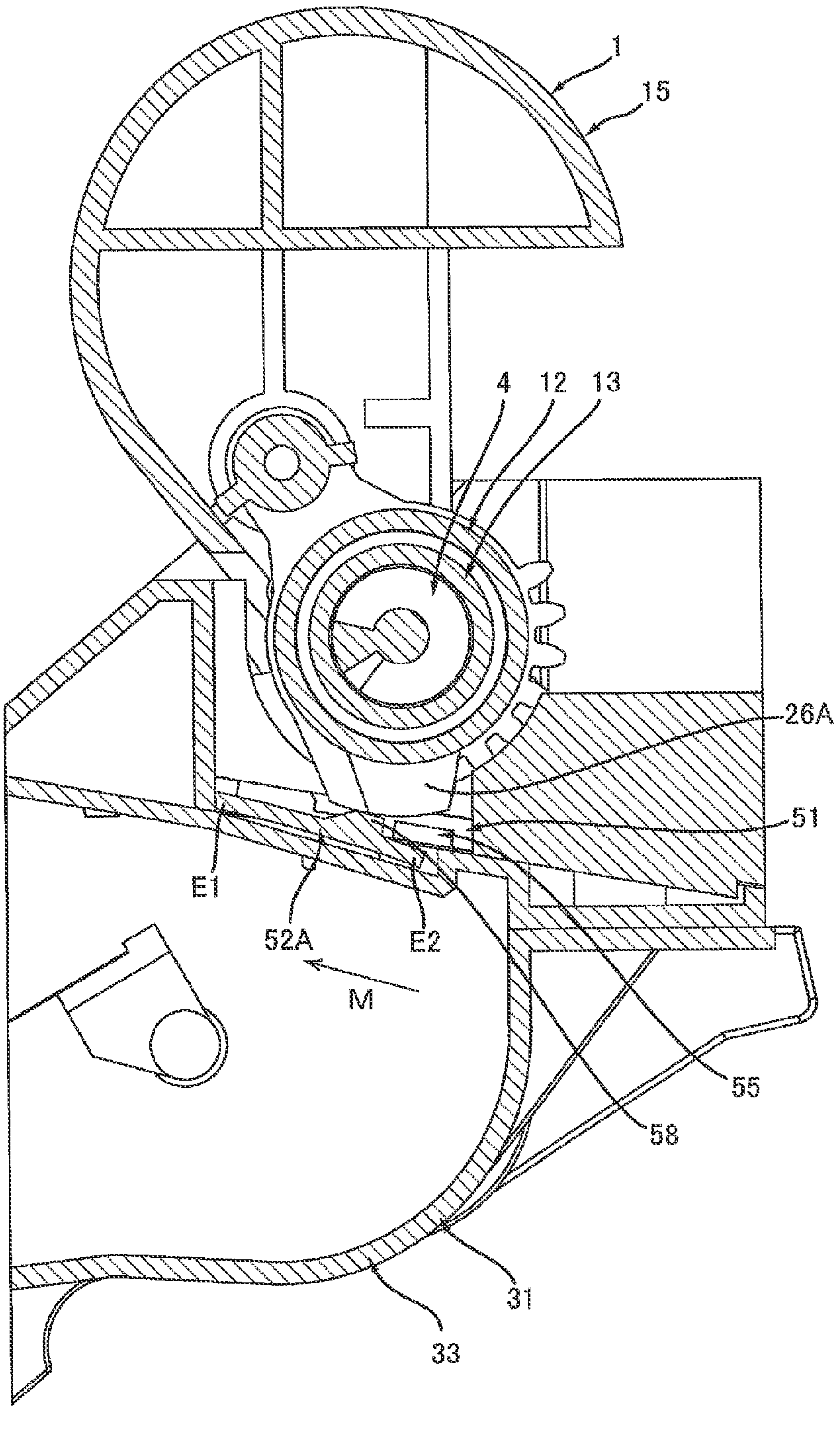
FIG. 17 is a cross-sectional view of the developing unit 31 and the toner cartridge 1 as illustrated in FIG. 13 taken along a line passing through a locking member 52A, which illustrates a state where the housing 2 is at the first position and a protrusion 26A of the toner cartridge 1 contacts a protrusion 58 of the locking member 52A.
Figure 19:
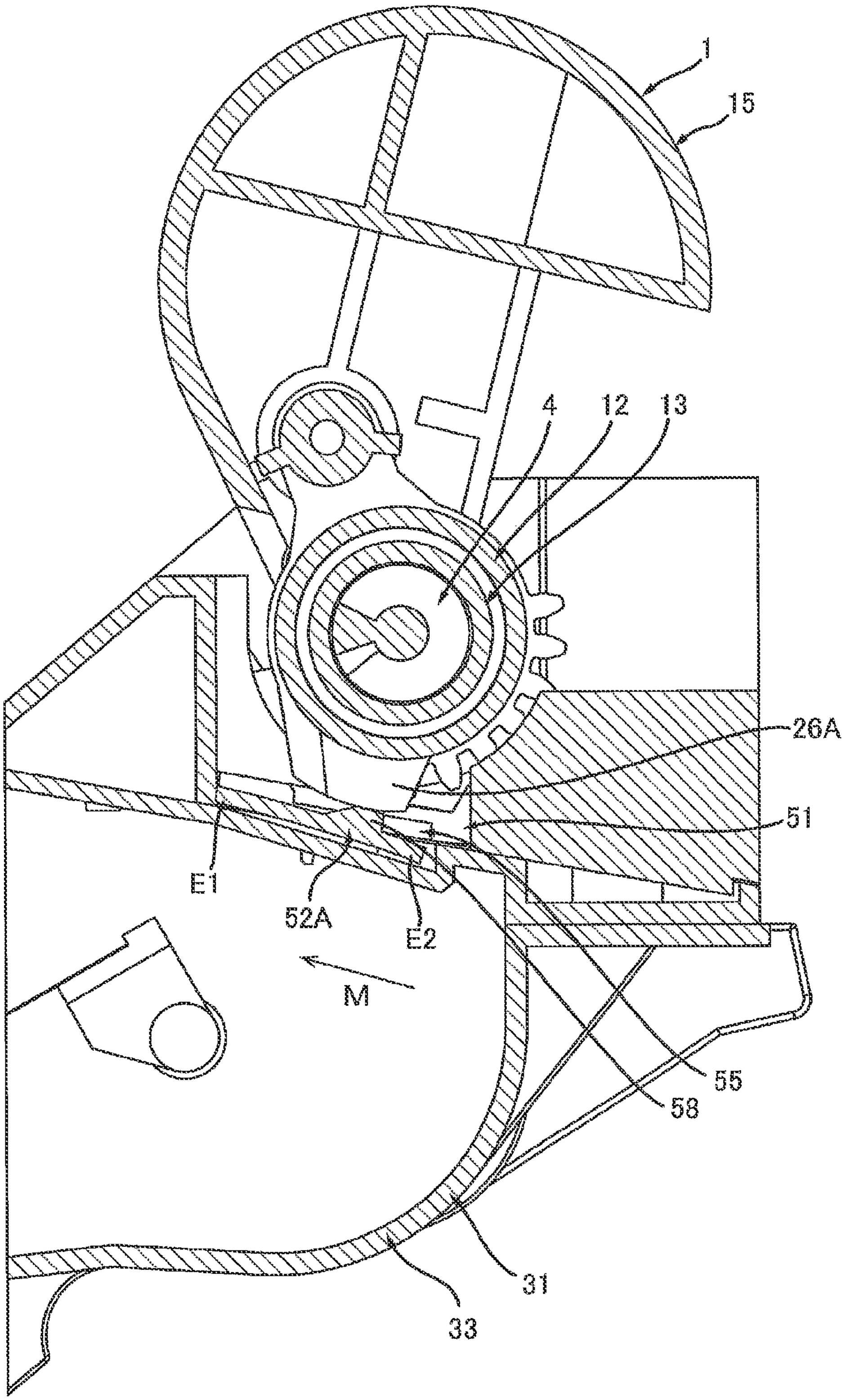
FIG. 19 is a cross-sectional view of the developing unit 31 and the toner cartridge 1 taken along a line passing through the second opening 13D of the shutter 13, which illustrates a state where the protrusion 26A of the toner cartridge 1 contacts the protrusion 58 of the locking member 52A.
Figure 21:
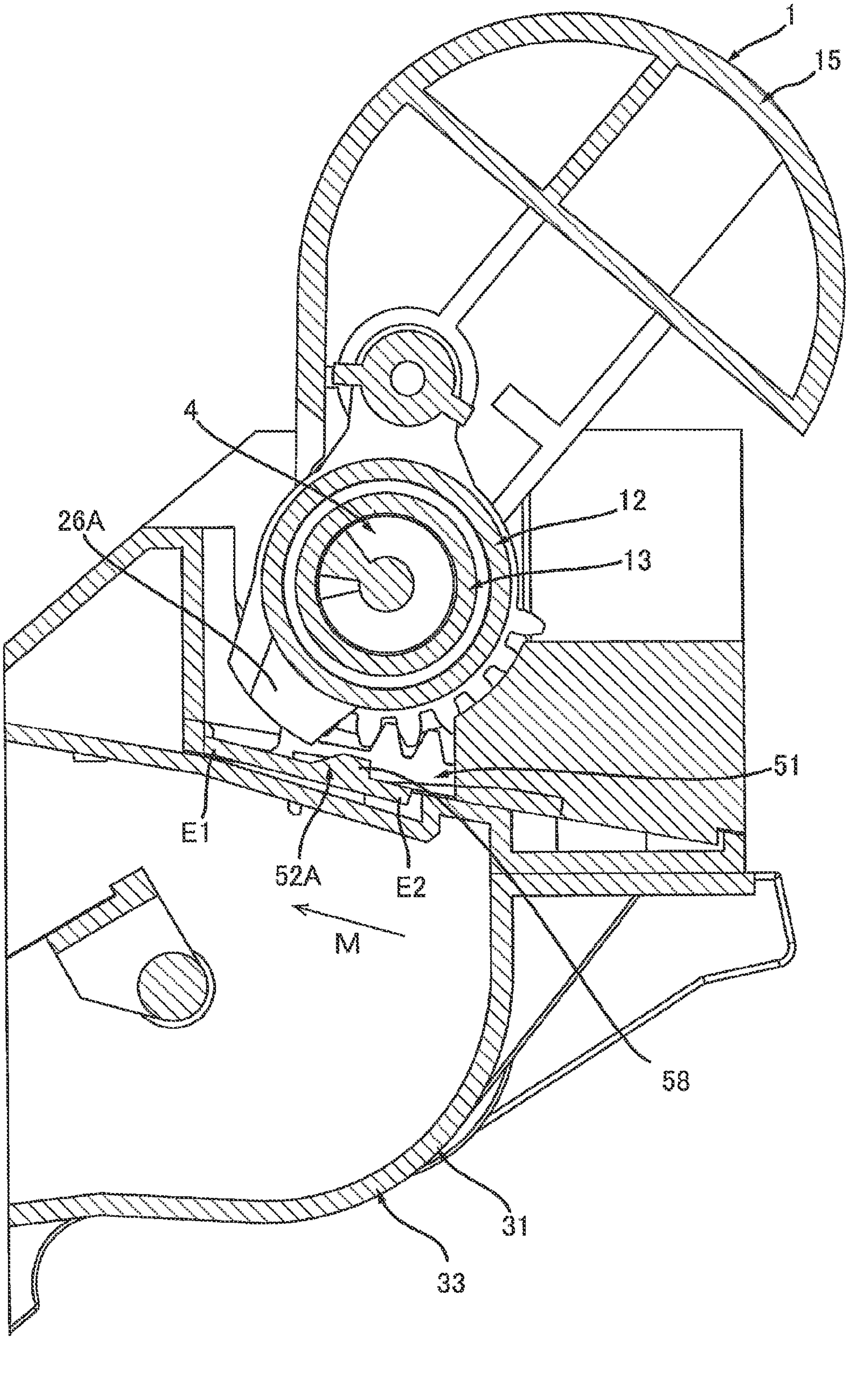
FIG. 21 is a cross-sectional view of the developing unit 31 and the toner cartridge 1 taken along a line passing through the locking member 52A, which illustrates a state where the protrusion 26A is separated from the protrusion 58 of the locking member 52A and the housing 2 is pivoted to a second position from the first position with respect to the developing unit 31.

As shown in FIGS. 17, 19, and 21, each of the locking members 52A and 52B is provided with a proximal end E1, and a distal end E2 separated from the proximal end E1 in the moving direction M of the developing shutter 51. The distal end E2 is positioned on the upstream side of the proximal end E1 in the moving direction M of the developing shutter 51, i.e., the direction in which the developing shutter 51 moves from the closed position to the open position. The proximal end E1 of the locking member 52A and the proximal end E1 of the locking member 52B are fixed to the developing unit 31. The locking members 52A and 52B are separated from the toner-accommodating section 33 in the mounting direction. With this configuration, the locking members 52A and 52B are capable of deflecting in the mounting direction. Each of the locking members 52A and 52B is provided with a protrusion 58 and a protrusion 59 (see also FIG. 18).

The protrusion 58 of the locking member 52A protrudes from the locking member 52A in the mounting direction, and specifically in a direction away from the toner-accommodating section 33. The protrusion 58 of the locking member 52B (see FIG. 9) protrudes from the locking member 52B in the mounting direction, and specifically in the direction away from the toner-accommodating section 33. The protrusion 58 of the locking member 52A contacts the protrusion 26A (see FIG. 1) when the toner cartridge 1 is mounted in the developing unit 31. The protrusion 58 of the locking member 52B contacts the protrusion 26B (see FIG. 1) when the toner cartridge 1 is mounted in the developing unit 31.

As shown in FIGS. 18, 20, 22, and 26, the protrusion 59 of the locking member 52A is positioned on the distal end E2 of the locking member 52A, and the protrusion 59 of the locking member 52B is positioned on the distal end E2 of the locking member 52B. The protrusions 59 extend in the first direction. Note that the protrusions 59 are fitted into the recessed part 55 formed in the developing shutter 51 when the toner cartridge 1 is removed from the developing unit 31 and the developing shutter 51 is placed in the closed position. When the protrusions 59 are fitted into the recessed part 55, the protrusions 59 contact the protrusion 57 of the developing shutter 51 when the developing shutter 51 is moved from the open position, preventing the developing shutter 51 from moving out of the closed position.

4. Attachment and Detachment of Toner Cartridge 1 to the Developing Unit 31

Next, the operations for attaching the toner cartridge 1 to the developing unit 31 and for removing the toner cartridge 1 from the developing unit 31 will be described with reference to FIGS. 12 through 27.

4.1 Attachment of Toner Cartridge 1 to Developing Unit 31

Figure 14:
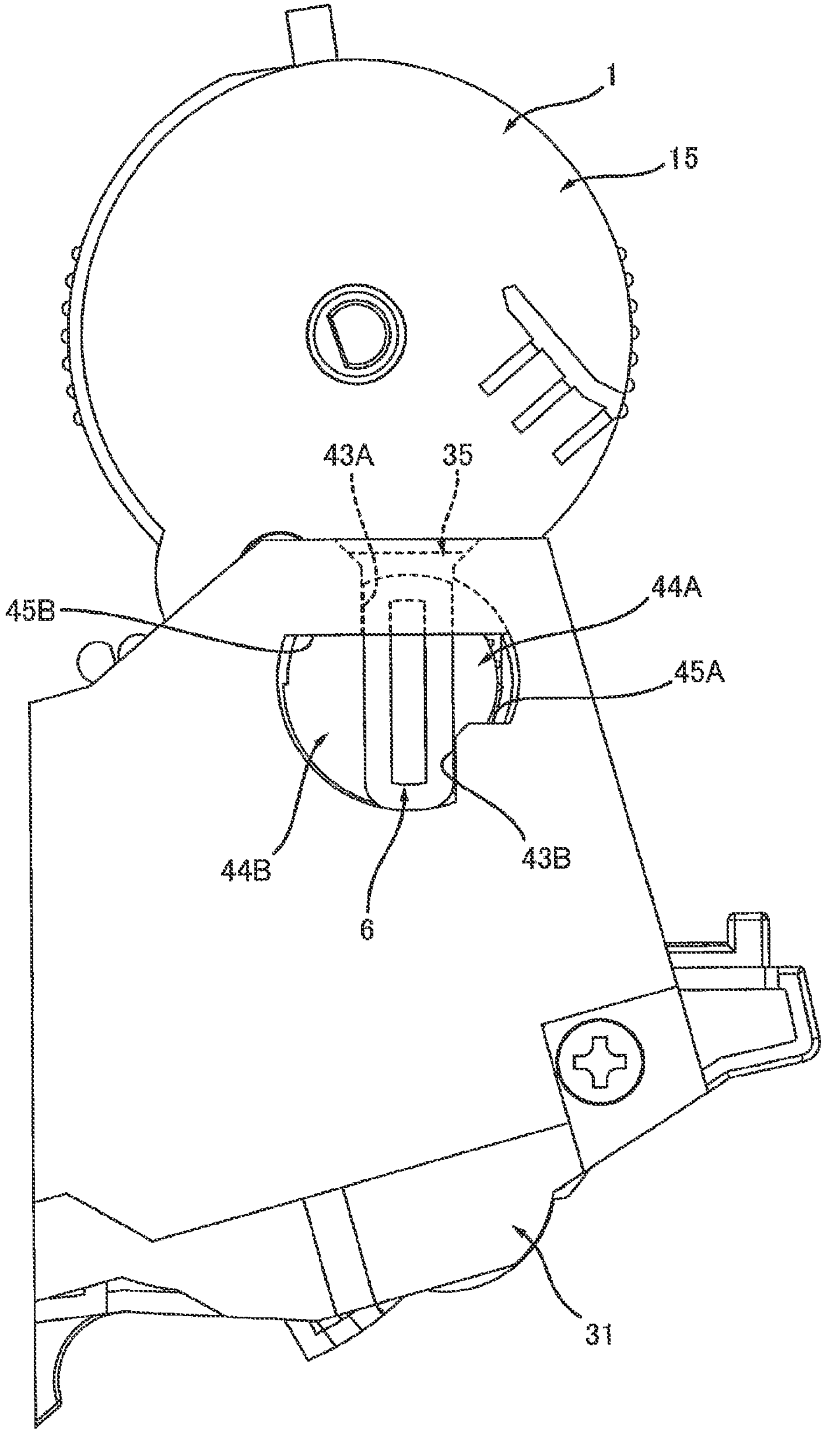
FIG. 14 is an explanatory drawing of engagement of a protrusion 6 and a groove 35 in a state as illustrated in FIG. 13.

To attach the toner cartridge 1 on the developing unit 31, the toner cartridge 1 is first mounted in the developing unit 31 by fitting the first protrusion 5 into the groove 34 and the second protrusion 6 into the groove 35, as shown in FIGS. 12, 13, and 14. Here, the first protrusion 5 is fixed in position relative to the developing unit 31 when fitted into the groove 34, and the second protrusion 6 is fixed in position relative to the developing unit 31 when fitted into the groove 35. Note that the housing 2 is disposed in the first position relative to the shutter 13 at this time, as illustrated in FIG. 1. The shutter 13 is disposed in the closed position relative to the cover 12 for closing the first opening 2C. In other words, the shutter 13 closes the first opening 2C when the housing 2 is in the first position.

Through this operation, the toner cartridge 1 is mounted in the developing unit 31, as shown in FIGS. 13 and 14. Further, the first protrusion 5 is fitted into the groove 34 and the second protrusion 6 is fitted into the groove 35. At this time, the protrusion 14 is positioned between the protrusions 41A and 41B, as shown in FIG. 15. Hence, the protrusion 14 is fixed in position relative to the developing unit 31 when the toner cartridge 1 is mounted in the developing unit 31.

Also at this time, the protrusion 41B contacts the protrusion 18B of the locking member 18, moving the locking member 18 from the locking position to the release position against the urging force of the spring 18C. In other words, when the toner cartridge 1 is mounted in the developing unit 31, the locking member 18 contacts part of the developing unit 31 and moves from the locking position to the release position. Consequently, the locking member 18 releases the lock on the protrusion 14 when the toner cartridge 1 is mounted in the developing unit 31. That is, the locking member 18 moves from the locking position to the release position, allowing the protrusion 14 to rotate relative to the second cover 15. Put another way, the second cover 15 can rotate relative to the protrusion 14 when the locking member 18 moves from the locking position to the release position. Accordingly, the housing 2 can rotate together with the cover 12 and second cover 15 relative to the shutter 13.

Figure 16:
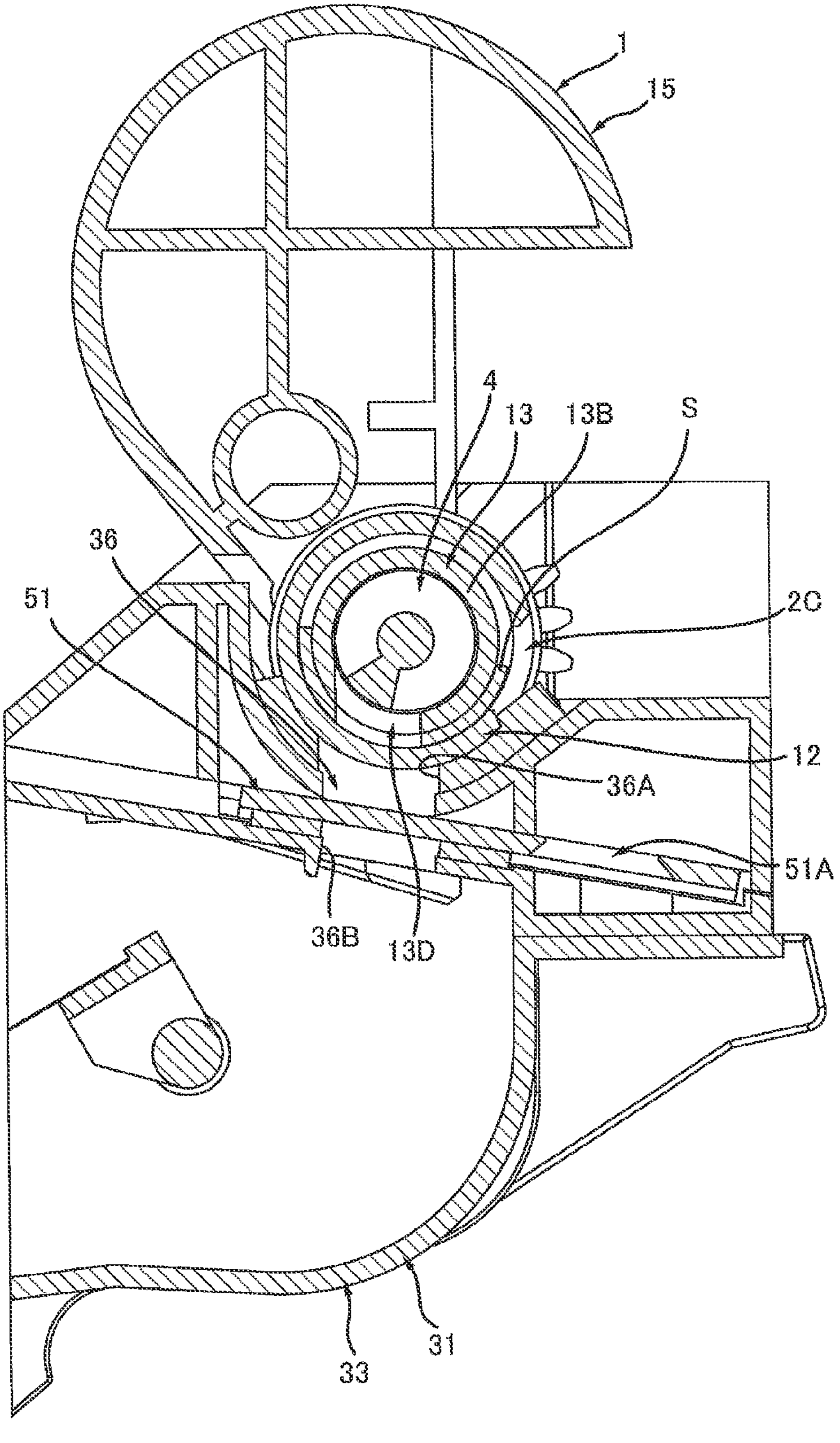
FIG. 16 a cross-sectional view of the developing unit 31 and the toner cartridge 1 as illustrated in FIG. 13 taken along a line passing through a second opening 13D of the shutter 13, which illustrates a state where the housing 2 is at the first position, the shutter 13 is at the closed position, and a developing shutter 51 is at the closed position.

Also at this time, the developing shutter 51 is disposed in the closed position, as shown in FIG. 16. Further, the protrusion 26A of the toner cartridge 1 contacts the protrusion 58 of the locking member 52A, as shown in FIG. 17. Through this contact, the locking member 52A is bent such that the distal end E2 of the locking member 52A is separated from the developing shutter 51. Consequently, the protrusion 59 of the locking member 52A is retracted from the recessed part 55 of the developing shutter 51, as illustrated in FIG. 18. Also at this time, the protrusion 53A of the developing shutter 51 is positioned between the protrusion 25A and gear part 24A of the toner cartridge 1.

Next, the user pivots the housing 2 relative to the developing unit 31 from the first position toward the second position.

Figure 20:
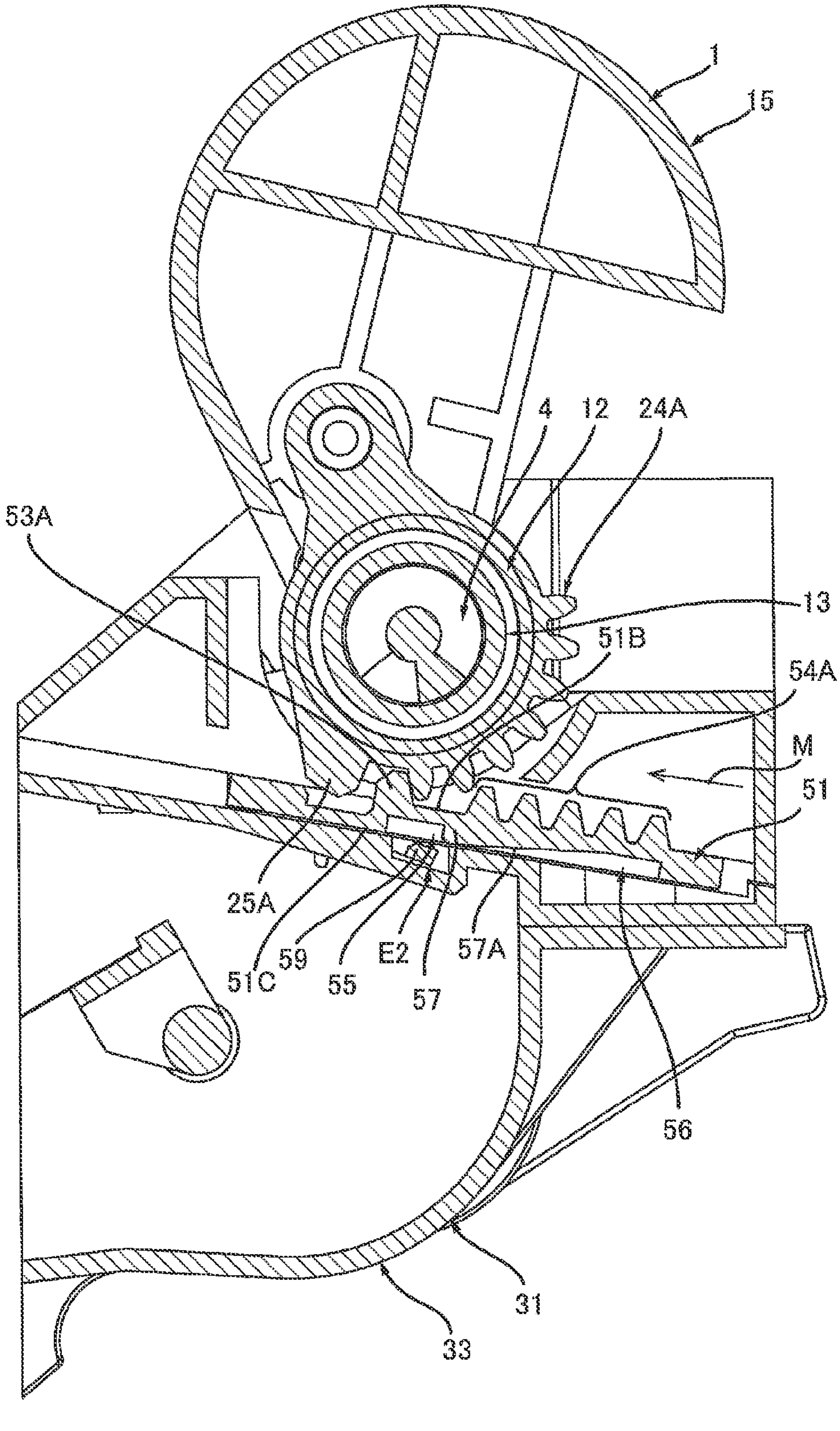
FIG. 20 is a cross-sectional view of the developing unit 31 and the toner cartridge 1 as illustrated in FIG. 19 taken along a line passing through the gear part 54A of the developing shutter 51, which illustrates a state where the protrusion 53A of the developing shutter 51 contacts the gear part 24A of the toner cartridge 1.

Through this operation, the housing 2 pivots about the first protrusion 5 and second protrusion 6 relative to the developing unit 31, moving from the first position toward the second position, and the gear part 24A applies pressure to the protrusion 53A while the protrusion 26A of the toner cartridge 1 is in contact with the protrusion 58 of the locking member 52A, as illustrated in FIGS. 19 and 20. Accordingly, the developing shutter 51 is moved from the closed position toward the open position while the protrusion 59 is still extracted from the recessed part 55.

Next, as the housing 2 continues to pivot from the first position toward the second position, the developing shutter 51 continues to move from the closed position toward the open position and the protrusion 57 advances to the opposite side to the toner-accommodating section 33 with respect to the protrusion 59.

Figure 22:
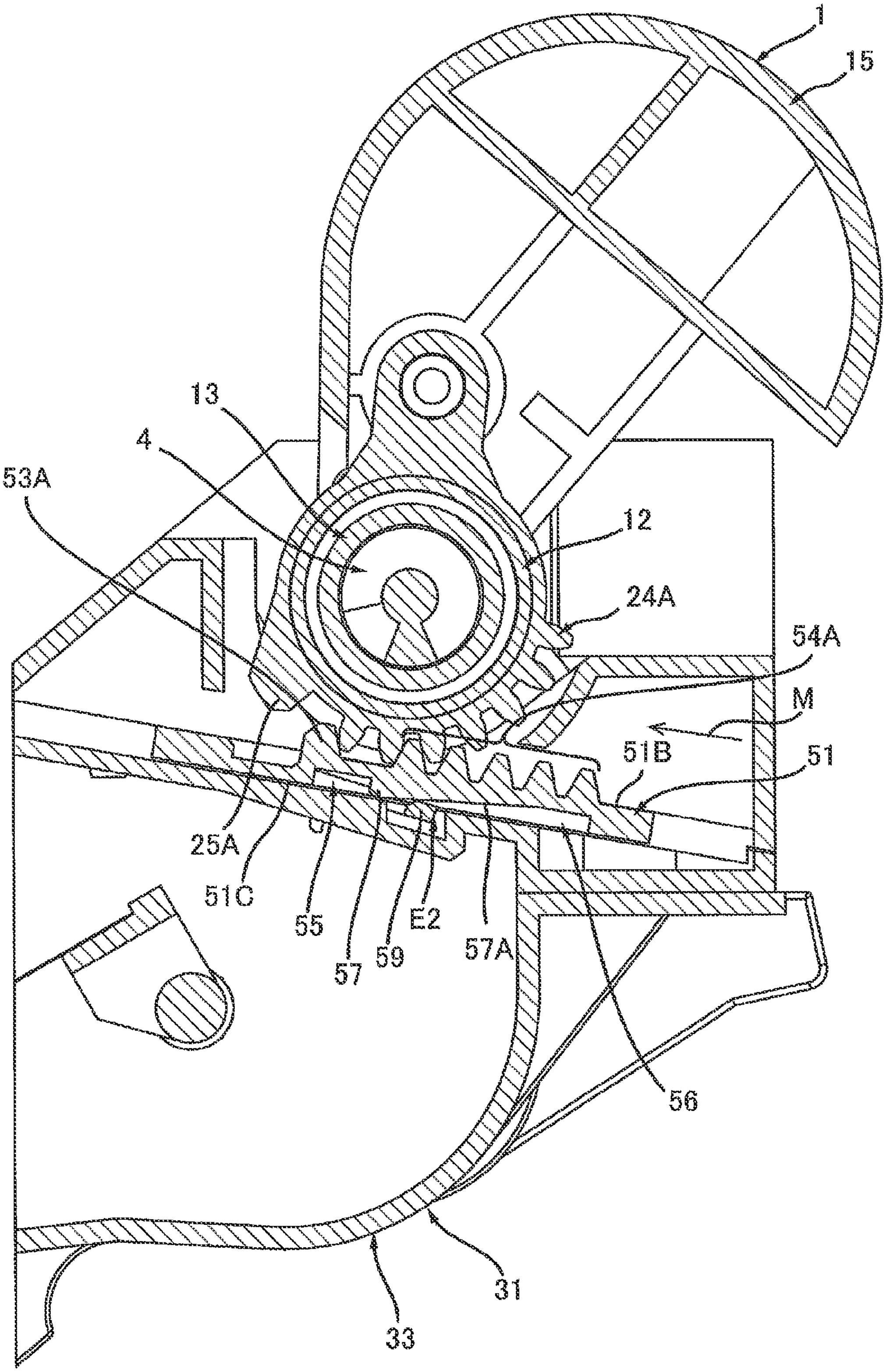
FIG. 22 is a cross-sectional view of the developing unit 31 and the toner cartridge 1 as illustrated in FIG. 21 taken along a line passing through the gear part 54A of the developing shutter 51, which illustrates a state where a protrusion 59 of the locking member 52A contacts a protrusion 57 of the developing shutter 51 and the gear part 24A engages with the gear part 54A.
Figure 23:
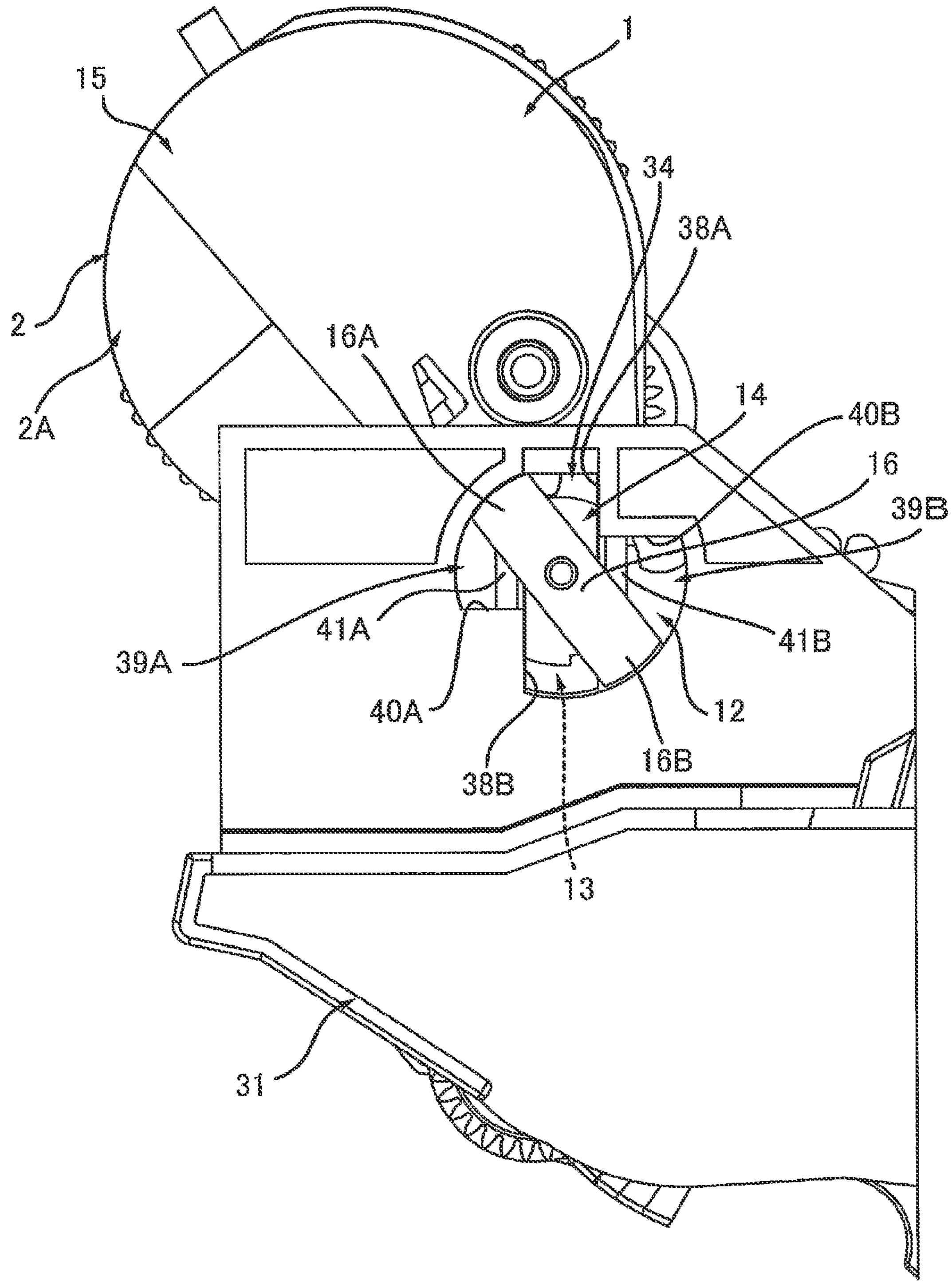
FIG. 23 is a side view of the developing unit 31 and the toner cartridge 1 as illustrated in FIG. 21.

Further, the protrusion 26A of the toner cartridge 1 separates from the protrusion 58 of the locking member 52A, as shown in FIG. 21. As a consequence, the locking member 52A is restored from its bent state so that the distal end E2 of the locking member 52A approaches the developing shutter 51. As a result, the protrusion 59 contacts the sloped surface 57A of the protrusion 57, as shown in FIG. 22. Further, the gear teeth on the gear part 24A mesh with the gear teeth on the gear part 54A. In other words, when the toner cartridge 1 is capable of pivoting relative to the developing unit 31, at least one of the gear teeth on the gear part 24A is engaged with the developing shutter 51 for opening and closing the developer opening 36 formed in the developing unit 31. Also at this time, the first frame part 16A of the protrusion 16 is positioned inside the recessed part 39A of the groove 34, while the second frame part 16B of the protrusion 16 is positioned inside the recessed part *39b* of the groove 34, as shown in FIG. 23.

Figure 24:
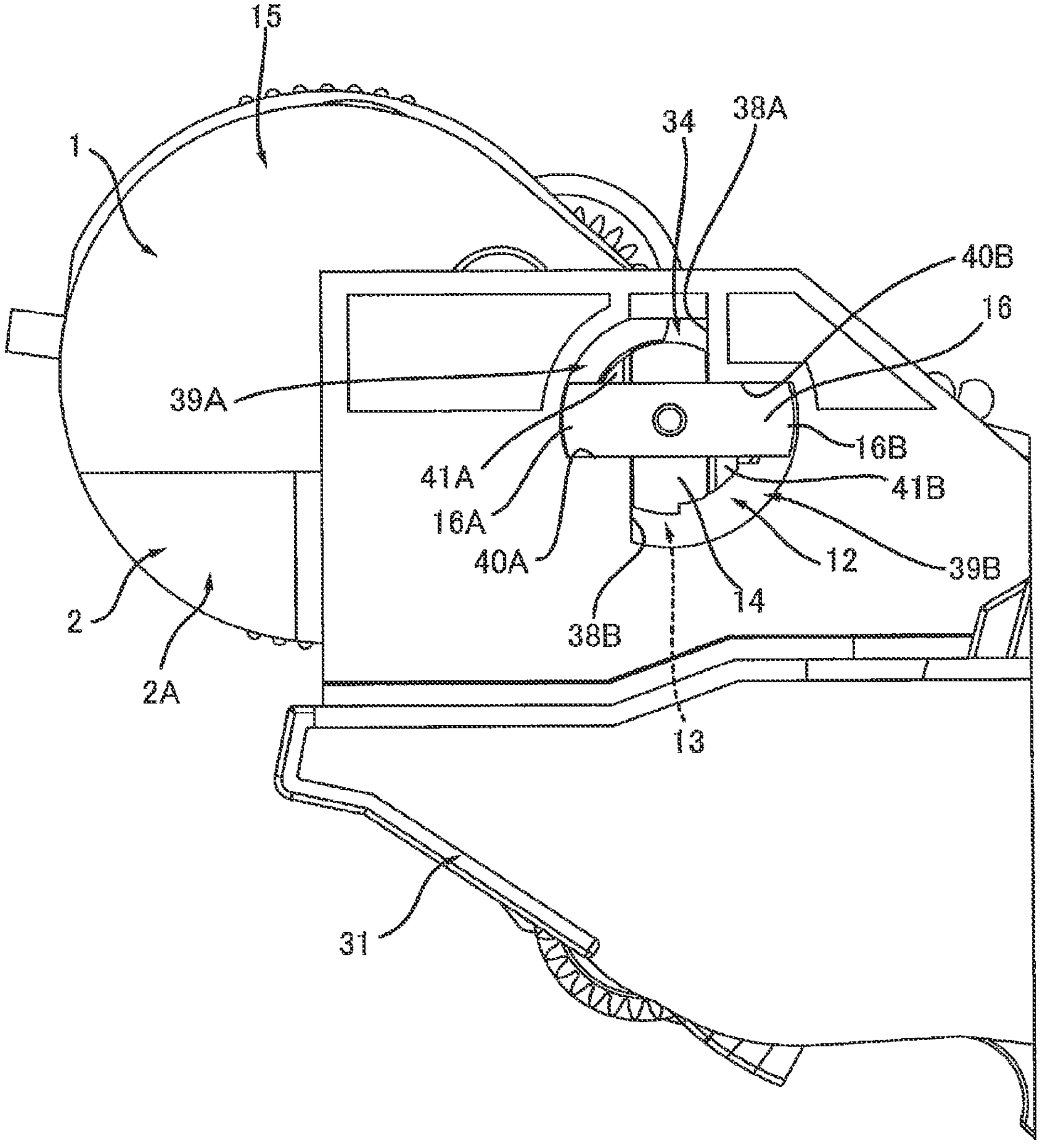
FIG. 24 is a side view of the developing unit 31 and the toner cartridge 1 in a state where the housing 2 is at the second position.
Figure 25:
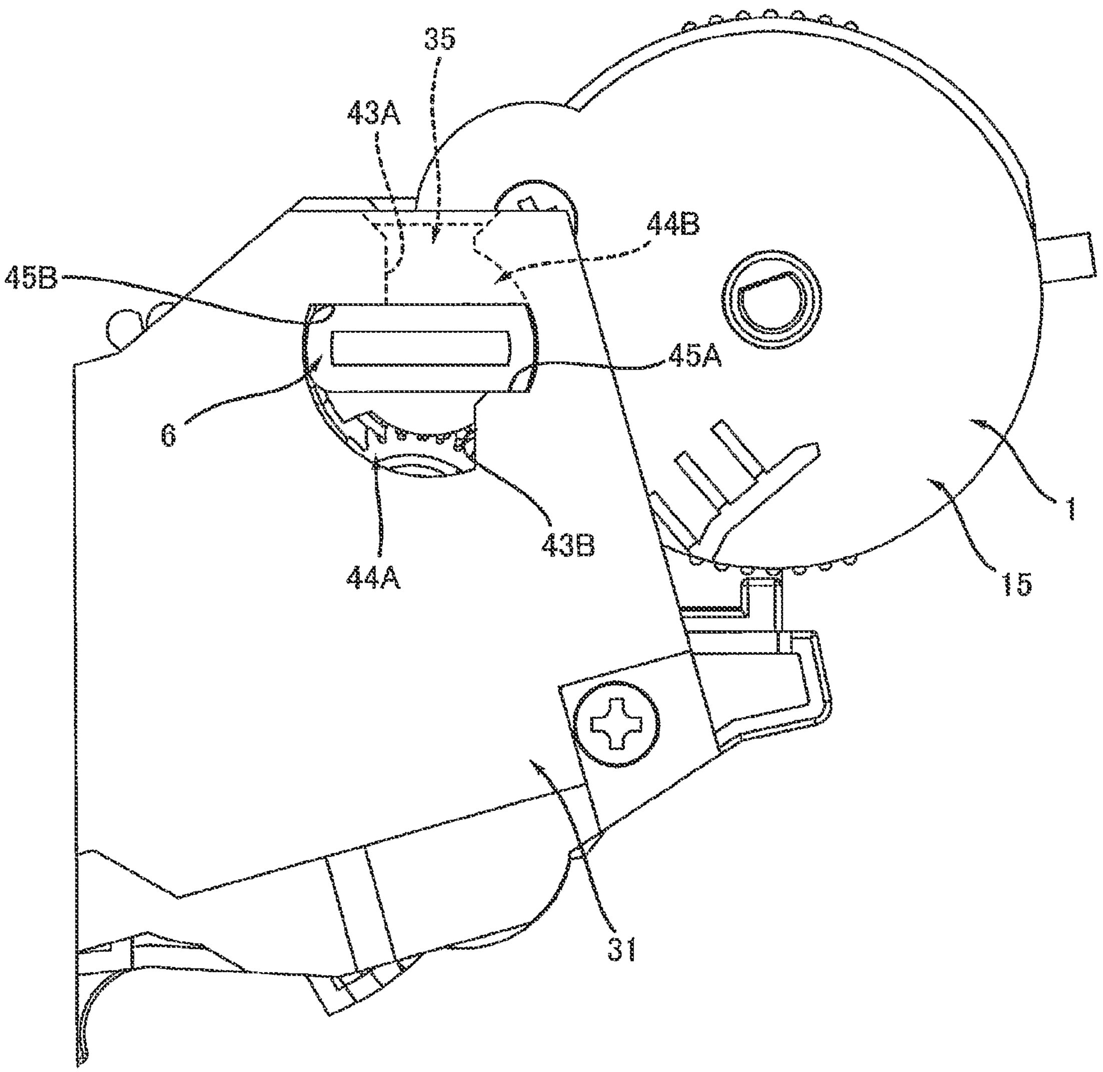
FIG. 25 is an explanatory drawing of engagement between the protrusion 6 and the groove 35 as illustrated in FIG. 24.
Figure 26:
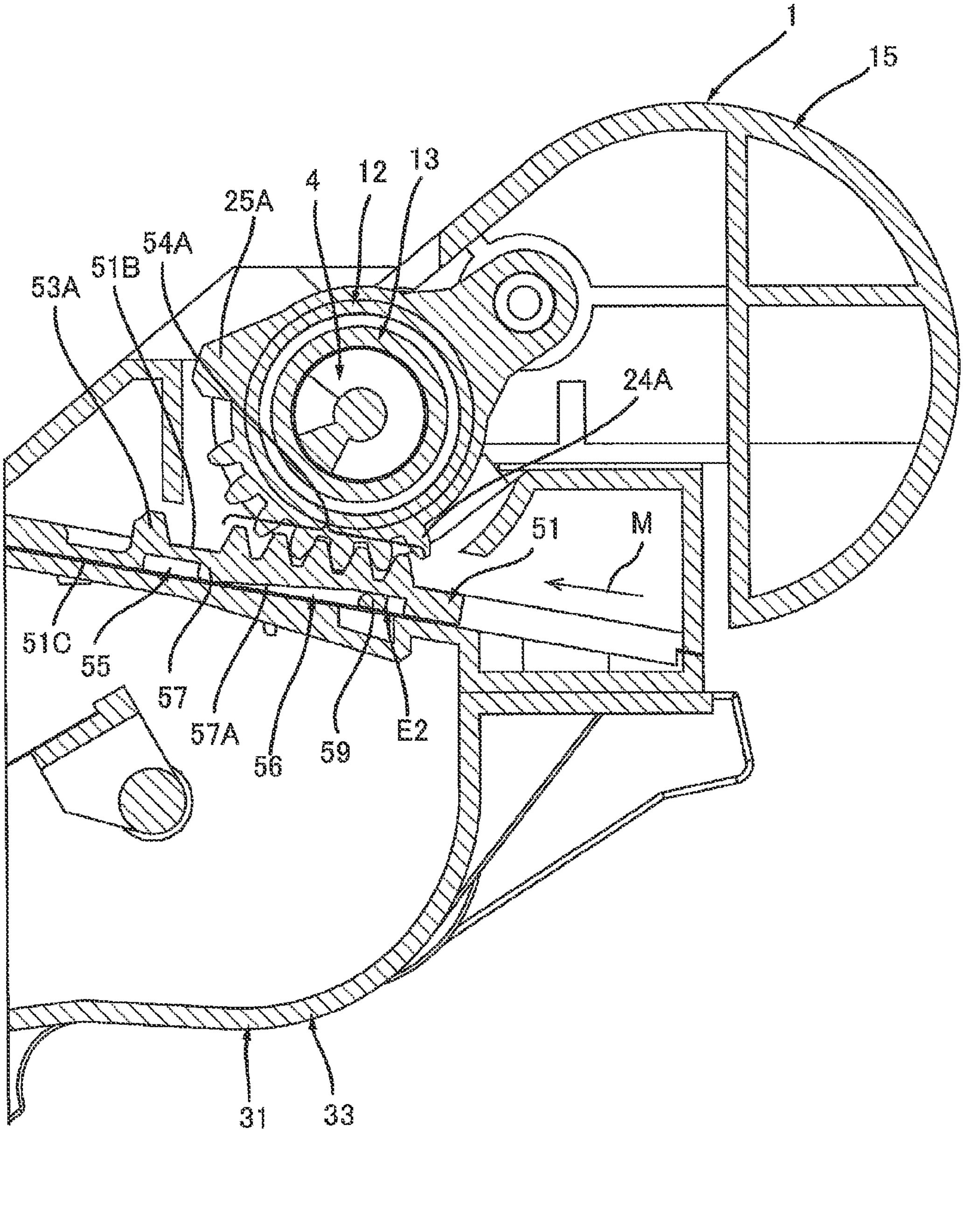
FIG. 26 is a cross-sectional view of the developing unit 31 and the toner cartridge 1 as illustrated in FIG. 24 taken along a line passing through the gear part 54A of the developing shutter 51, which illustrates a state where the protrusion 59 of the locking member 52A is positioned in a recessed part 56 of the developing shutter 51.
Figure 27:
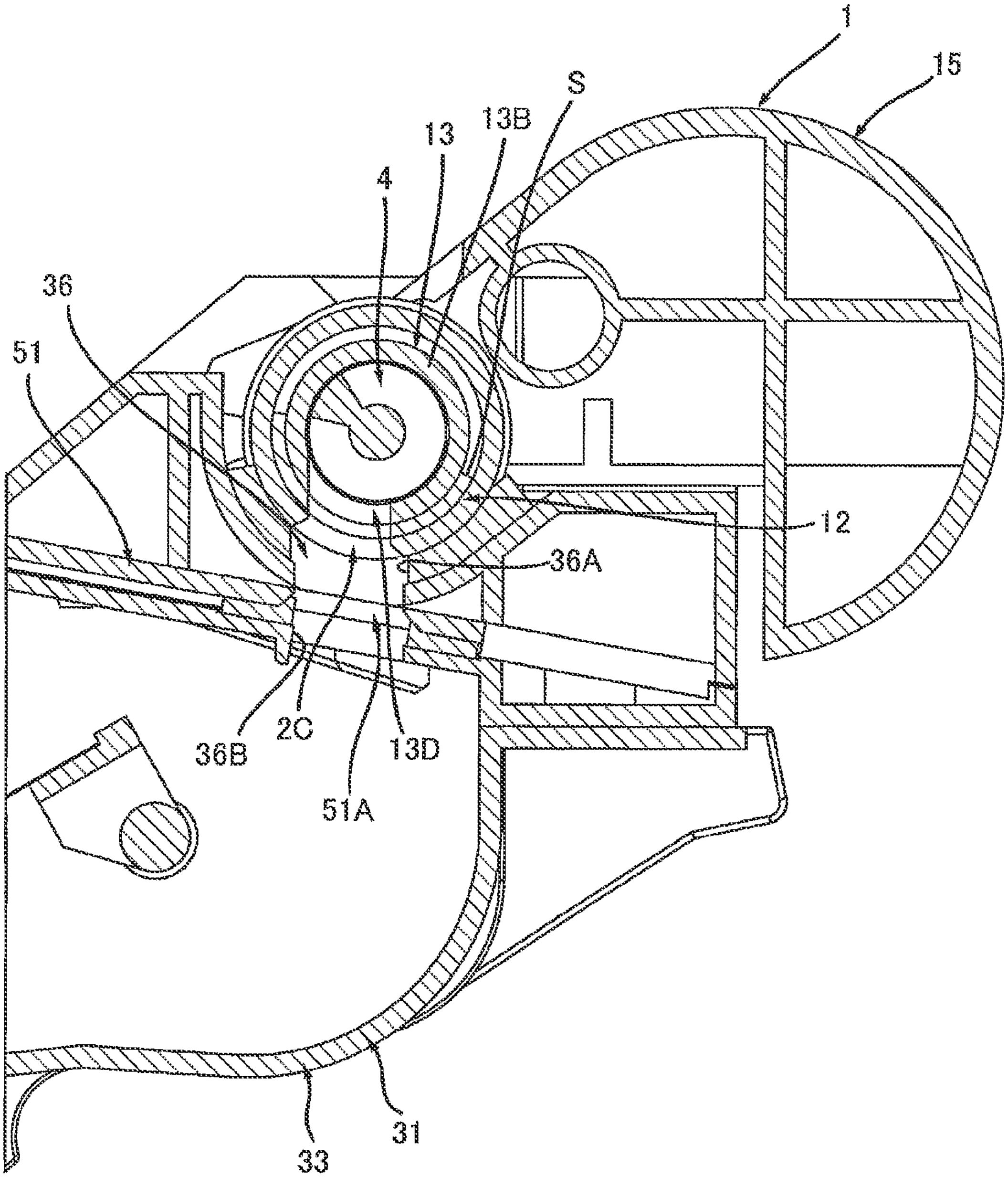
FIG. 27 is a cross-sectional view of the developing unit 31 and the toner cartridge 1 as illustrated in FIG. 24 taken along a line passing through the second opening 13D of the shutter 13, which illustrates a state where the shutter 13 is at the open position and the developing shutter 51 is at the open position.

Next, as illustrated in FIGS. 24 and 25, at least one of the first frame part 16A and second frame part 16B constituting the protrusion 16 contacts the corresponding flat surfaces 40A and 40B of the groove 34, and at least one of the upstream and downstream end portions of the second protrusion 6 contacts the respective flat surfaces 45A and 45B of the groove 35, thereby halting the housing 2 in the second position relative to the shutter 13. At this time, the developing shutter 51 is in the open position and the protrusion 59 is positioned inside the recessed part 56, as shown in FIG. 26. Further, the shutter 13 is in the open position relative to the housing 2, and at least part of the second opening 13D overlaps at least part of the first opening 2C, as shown in FIG. 27, thereby allowing toner in the toner cartridge 1 to be discharged from the toner cartridge 1 through the first opening 2C and the second opening 13D.

This completes the operations for attachment of the toner cartridge 1 on the developing unit 31.

4.2 Detachment of Toner Cartridge 1 from Developing Unit 31

To remove the toner cartridge 1 from the developing unit 31, the user pivots the housing 2 relative to the developing unit 31 from the second position shown in FIGS. 24 and 25, to the first position shown in FIGS. 13 and 14.

Through this operation, the developing shutter 51 moves from the open position toward the closed position through the meshing of the gear part 24A in the toner cartridge 1 and the gear part 54A and the meshing of the gear part 24B in the toner cartridge 1 and the gear part 54B, as shown in FIG. 22.

At this time, the protrusion 59 moves in the mounting direction while sliding along the sloped surface 57A of the protrusion 57, and specifically moves in the direction away from the developing shutter 51.

Next, as the housing 2 approaches the first position, as shown in FIG. 19, the protrusion 26A of the toner cartridge 1 contacts the protrusion 58 of the locking member 52A. Also at the same time, as shown in FIG. 20, the gear part 24A of the toner cartridge 1 separates from the gear part 54A and the gear part 24B of the toner cartridge 1 separates from the gear part 54B, thereby temporarily halting movement of the developing shutter 51.

As the housing 2 continues to approach the first position, the protrusion 25A of the toner cartridge 1 contacts the protrusion 53A of the developing shutter 51 and the protrusion 25B of the toner cartridge 1 contacts the protrusion 53B of the developing shutter 51. The protrusion 25A of the toner cartridge 1 applies pressure to the protrusion 53A of the developing shutter 51, while the protrusion 25B of the toner cartridge 1 applies pressure to the protrusion 53B of the developing shutter 51, once again causing the developing shutter 51 to move toward the closed position.

Next, as shown in FIGS. 13 and 14, at least one of the first frame part 16A and second frame part 16B of the protrusion 16 contacts the corresponding flat surface 38A or 38B of the groove 34, and at least one of the upstream and downstream end portions of the second protrusion 6 contacts the corresponding flat surface 43A or 43B of the groove 35, thereby halting the housing 2 in the first position. At this time, the developing shutter 51 is in the closed position shown in FIG. 18. Also at this time, the shutter 13 is in the closed position relative to the cover 12, closing the first opening 2C, as shown in FIG. 16.

Next, the user pulls the toner cartridge 1 away from the developing unit 31 in the second direction, as shown in FIG. 12.

This completes the operations for detaching the toner cartridge 1 from the developing unit 31.

5. Conveying Operation of Toner from Developing Unit to Toner Cartridge

When the toner cartridge 1 is mounted in the developing unit 31 and the housing 2 is placed in the second position, the auger gear 23 of the toner cartridge 1 is meshed with the gear 30 of the developing unit 31 (see FIG. 9).

When the image-forming apparatus subsequently executes an image-forming operation, a drive force is inputted into the auger gear 23 of the toner cartridge 1 from the gear 30 of the developing unit 31. This drive force rotates the auger 4, as shown in FIG. 2. The drive force is further inputted from the auger gear 23 into the agitator 3 via a gear train (not shown), driving the agitator 3 to rotate.

The rotation of the agitator 3 conveys toner from the first interior space 2D to the second interior space 2E.

Next, the auger 4 conveys the toner in the second interior space 2E into the interior space of the shutter 13, as illustrated in FIG. 4.

The toner in the interior of the shutter 13 is subsequently supplied into the toner-accommodating section 33 of the developing unit 31 via the opening formed by the overlapping second opening 13D and first opening 2C, and supplied via the opening formed by the overlapping opening 51A of the developing shutter 51 and developer opening 36, as shown in FIG. 27. Hence, the first opening 2C allows toner to be discharged from the second interior space 2E.

6. Technical Effect

As shown in FIGS. 1 through 3, the second toner-accommodating section 2B is positioned on one side of the first toner-accommodating section 2A in the second direction. This arrangement allows the toner cartridge 1 to be made more compact in the first direction while still securing sufficient toner capacity in the first toner-accommodating section 2A and second toner-accommodating section 2B in the second direction.

When attaching the toner cartridge 1 to the developing unit 31, the toner cartridge 1 can be positioned relative to the developing unit 31 by the first protrusion 5 and second protrusion 6, as shown in FIGS. 13 and 14. Accordingly, the first opening 2C can be accurately positioned relative to the developing unit 31.

After the toner cartridge 1 has been attached to the developing unit 31, the agitator 3 conveys toner in the first toner-accommodating section 2A to the second toner-accommodating section 2B, as shown in FIG. 2, and the auger 4 conveys toner in the second toner-accommodating section 2B to the first opening 2C, as shown in FIG. 4.

With this configuration, the agitator 3 and auger 4 can convey toner smoothly from the first toner-accommodating section 2A to the first opening 2C. Further, by conveying toner with the auger 4, it is possible to adjust the amount of toner discharged from the first opening 2C. Note that, since the first opening 2C is positioned on the first side of the second toner-accommodating section 2B in the first direction, a simple construction comprising the auger 4 arranged along the first direction can be used to convey toner to the first opening 2C. This construction can reduce the number of parts required for conveying toner to the first opening 2C.

In summary, the first protrusion 5 is positioned on the first side of the second toner-accommodating section 2B in the first direction, and the second protrusion 6 is positioned on the second side of the second toner-accommodating section 2B in the first direction, as shown in FIG. 1. Further, the auger 4 conveys toner to the first opening 2C between the first protrusion 5 and second protrusion 6. Accordingly, this structure can reduce the number of required parts or members, while conveying toner smoothly to the first opening 2C accurately positioned relative to the developing unit 31, and can adjust the amount of toner discharged through the first opening 2C.

Thus, the toner cartridge 1 can convey toner smoothly and can adjust the amount of discharged toner.

Note that the first side and the second side in the first direction are examples of one side and another side in the first direction, respectively. The third opening is an example of an opening part. The first end portion and the second end portion of the auger 4 are examples of one end portion and another end portion.

While the description has been made in detail with reference to specific embodiment(s) thereof, it would be apparent to those skilled in the art that various changes and modifications may be made therein without departing from the spirit and scope of the above described embodiment(s).

What is claimed is:

1. A method of attaching a toner cartridge to a developing unit, the toner cartridge including a housing accommodating toner therein and having a first opening allowing toner to be discharged therefrom, an auger rotatable about a first axis extending in a first direction and configured to convey the toner to the first opening in the first direction, the auger having one end portion and another end portion positioned apart from the one end portion in the first direction, a first protrusion extending in the first direction and being positioned closer to the one end portion of the auger than the another end portion of the auger is to the one end portion of the auger, the first protrusion being rotatable relative to the housing, and a second protrusion extending in the first direction and being positioned closer to the another end portion of the auger than the one end portion of the auger is to the another end portion of the auger, the method comprising:

inserting the first protrusion into a corresponding first groove of the developing unit;

inserting the second protrusion into a corresponding second groove of the developing unit; and in a state where the first protrusion is received in the first groove and the second protrusion is received in the second groove, pivoting the housing of the toner cartridge relative to the developing unit.

2. The method according to claim 1, wherein in the state where the first protrusion is received in the first groove and the second protrusion is received in the second groove, the housing of the toner cartridge is pivoted relative to the developing unit, with the first protrusion and the second protrusion being positioned at a center of a pivotal movement of the housing.

3. The method according to claim 1, wherein the toner cartridge includes a first gear part provided to the housing and having gear teeth, wherein the developing unit includes:

a casing configured to accommodate therein toner supplied from the toner cartridge; and a second gear part movable relative to the casing and having gear teeth, and wherein the housing of the toner cartridge is pivoted relative to the developing unit, thereby causing the gear teeth of the first gear part of the toner cartridge to be brought into meshing engagement with the gear teeth of the second gear part of the developing unit.

4. The method according to claim 3, wherein after the gear teeth of the first gear part are brought into meshing engagement with the gear teeth of the second gear part, the housing of the toner cartridge continues being pivoted relative to the casing of the developing unit in a state where the gear teeth of the first gear part are in meshing engagement with the gear teeth of the second gear part.

5. The method according to claim 3, wherein the toner cartridge further includes a cover shutter which is rotatable together with the first protrusion relative to the housing and which is formed with a second opening, wherein the housing is pivoted from a first position to a second position relative to the casing of the developing unit, the first opening being covered by the cover shutter when the housing is at the first position, the first opening being in communication with the second opening when the housing is at the second position.

6. The method according to claim 1, wherein the toner cartridge includes a first gear part provided to the housing and having gear teeth, wherein the developing unit includes:

a casing configured to accommodate therein toner supplied from the toner cartridge; and a second gear part movable relative to the casing and having gear teeth, and wherein the housing of the toner cartridge is pivoted relative to the casing of the developing unit such that the first gear part pivots together with the housing of the toner cartridge relative to the casing of the developing unit.

7. The method according to claim 6, wherein the housing of the toner cartridge is pivoted relative to the developing unit, thereby causing the gear teeth of the first gear part of the toner cartridge to be brought into meshing engagement with the gear teeth of the second gear part of the developing unit, and wherein after the gear teeth of the first gear part are brought into meshing engagement with the gear teeth of the second gear part, the second gear part moves together with the first gear part relative to the casing of the developing unit in a state where the gear teeth of the second gear part are in meshing engagement with the gear teeth of the first gear part.

8. The method according to claim 1, wherein the second protrusion is fixed to the housing of the toner cartridge, and wherein the housing of the toner cartridge is pivoted relative to the developing unit, thereby causing the second protrusion to be pivoted together with the housing of the toner cartridge relative to the developing unit.

9. The method according to claim 1, wherein the housing is pivotable about the first axis.

* * * * *